(12) United States Patent
Kim et al.

(10) Patent No.: US 12,387,523 B2
(45) Date of Patent: Aug. 12, 2025

(54) DISPLAY DEVICE WITH INTEGRATED FINGERPRINT SENSING AND LIGHT CONVERSION FEATURES

(71) Applicant: SAMSUNG DISPLAY CO., LTD., Yongin-si (KR)

(72) Inventors: Tae Ho Kim, Yongin-si (KR); Hyeo Ji Kang, Yongin-si (KR); Oh Jeong Kwon, Yongin-si (KR); Su Jeong Kim, Yongin-si (KR); Mi Hwa Lee, Yongin-si (KR); Hong Yeon Lee, Yongin-si (KR); Sung Gyu Jang, Yongin-si (KR); Seung Yeon Jeong, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 64 days.

(21) Appl. No.: 18/454,162

(22) Filed: Aug. 23, 2023

(65) Prior Publication Data
US 2024/0265726 A1 Aug. 8, 2024

(30) Foreign Application Priority Data
Jan. 25, 2023 (KR) .................. 10-2023-0009727

(51) Int. Cl.
G06F 3/044 (2006.01)
G06V 40/13 (2022.01)

(52) U.S. Cl.
CPC ........ *G06V 40/1318* (2022.01); *G06F 3/0445* (2019.05); *G06F 2203/04112* (2013.01)

(58) Field of Classification Search
CPC ...... G06V 40/1318; G06F 3/042–0428; G09G 2354/00; H10K 59/40–70
See application file for complete search history.

(56) References Cited

U.S. PATENT DOCUMENTS

| 2020/0111851 | A1* | 4/2020 | Park ..................... G06F 21/32 |
| 2020/0274089 | A1* | 8/2020 | Son ..................... H10K 50/8428 |
| 2021/0013265 | A1* | 1/2021 | Hinata ................. H10K 59/38 |
| 2021/0126218 | A1* | 4/2021 | Kim ..................... H10K 50/166 |
| 2022/0020821 | A1* | 1/2022 | Kim ..................... G06F 3/0446 |
| 2022/0020943 | A1* | 1/2022 | Chung ................. H10K 59/353 |

FOREIGN PATENT DOCUMENTS

KR 10-2022-0059209 5/2022

* cited by examiner

*Primary Examiner* — Roberto W Flores
(74) *Attorney, Agent, or Firm* — F. CHAU & ASSOCIATES, LLC

(57) ABSTRACT

A display device including: a substrate; a plurality of light-emitting elements on the substrate; and a touch sensing layer disposed on the plurality of light-emitting elements, wherein the touch sensing layer includes: a first touch conductive layer; a first insulating layer disposed on the first touch conductive layer; and a second touch conductive layer disposed on the first insulating layer, and wherein the first insulating layer includes a light-converting material that converts light into near-infrared light.

15 Claims, 14 Drawing Sheets

DISPLAY DEVICE WITH INTEGRATED FINGERPRINT SENSING AND LIGHT CONVERSION FEATURES

This application claims priority under 35 U.S.C. § 119 to Korean Patent Application No. 10-2023-0009727 filed on Jan. 25, 2023, in the Korean Intellectual Property Office, the disclosure of which is incorporated by reference herein in its entirety.

1. TECHNICAL FIELD

The present disclosure relates to a display device.

2. DESCRIPTION OF THE RELATED ART

As society becomes increasingly information-centric, the demand for various types of display devices is continually growing. These devices are being utilized by a wide range of electronic devices such as smart phones, digital cameras, laptop computers, navigation devices, smart watches, and smart televisions. Display devices may be flat panel display devices such as liquid-crystal display devices, field emission display devices, and organic light-emitting display devices.

Numerous efforts are currently in progress to develop technology capable of incorporating touch or fingerprint recognition sensors into these display devices. To enhance the accuracy of fingerprint recognition, it is beneficial to concentrate an area of light incident on a light-sensing area (hereinafter referred to as "fingerprint sensing area"). The fingerprint sensing area is typically defined by the light-sensing area itself and an opening within a light-blocking layer formed on the light-sensing area. As a result, various research efforts are being conducted to improve the accuracy of fingerprint recognition.

SUMMARY

Embodiments of the present disclosure provide a display device that can improve fingerprint sensing features and light emission efficiency.

According to an embodiment of the present disclosure, there is provided a display device including: a substrate; a plurality of light-emitting elements on the substrate; and a touch sensing layer disposed on the plurality of light-emitting elements, wherein the touch sensing layer includes: a first touch conductive layer; a first insulating layer disposed on the first touch conductive layer; and a second touch conductive layer disposed on the first insulating layer, and wherein the first insulating layer includes a light-converting material that converts light into near-infrared light.

The light-emitting elements include a red light-emitting element, a green light-emitting element and a blue light-emitting element, and wherein the first insulating layer overlaps the red light-emitting element, the green light-emitting element, or the blue light-emitting element.

The light-emitting elements include a red light-emitting element, a green light-emitting element and a blue light-emitting element, wherein the green light-emitting element is disposed in a first emission area, the red light-emitting element is disposed in a second emission area, the blue light-emitting element is disposed in a third light emission area, and one of the red light-emitting element, the green light-emitting element or the blue light-emitting element is disposed in the fourth emission area.

The first insulating layer overlaps with the fourth emission area.

The first insulating layer includes openings overlapping the first emission area, the second emission area, and the third emission area, respectively.

The display device further includes: a photoelectric conversion element adjacent to the plurality of light-emitting elements, wherein the first insulating layer comprises an opening overlapping the photoelectric conversion element.

The light-converting material includes quantum dots, a colorant, or a metal composite.

The colorant is an organic pigment or an organic dye.

A content of the quantum dots ranges from 20 wt % to 40 wt % with respect to a total solid content of the first insulating layer.

A content of the colorant or the metal composite ranges from 10 wt % to 40 wt % with respect to a total solid content of the first insulating layer.

The touch sensing layer includes the first touch conductive layer, the second touch conductive layer, and a second insulating layer disposed on the first insulating layer, and wherein the second insulating layer has a thickness of 5 µm to 10 µm.

According to an embodiment of the present disclosure, there is provided a display device including: a substrate; a bank layer disposed on the substrate and defining a plurality of emission areas and a light-sensing area; a plurality of light-emitting elements and a photoelectric conversion element disposed on the substrate and the bank layer; and a touch sensing layer disposed on the plurality of light-emitting elements and the photoelectric conversion element, wherein the plurality of emission areas comprises at least two emission areas emitting a light of a same color, wherein the touch sensing layer includes a first insulating layer overlapping one of the two emission areas, and wherein the first insulating layer includes a light-converting material that converts light into near-infrared light.

The plurality of emission areas includes a first emission area, a second emission area, a third emission area, and a fourth emission area arranged adjacent to one another, and the plurality of light emitting elements includes a light-emitting element overlapping with the first emission area and emitting green light, a light-emitting element overlapping with the second emission area and emitting red light, a light-emitting element overlapping with the third emission area and emitting blue light, and a light-emitting element overlapping with the fourth emission area and emitting one of green, red and blue lights.

The photoelectric conversion element includes a photoelectric conversion layer overlapping with the light-sensing area and disposed between two electrodes.

One of the green, red and blue lights enters the first insulating layer and exits as the near-infrared light in the fourth emission area, and when the near-infrared light is reflected by a user's fingerprint, the near-infrared light is incident on the light-sensing area.

The first insulating layer includes openings overlapping the first emission area, the second emission area, the third emission area and the light-sensing area, respectively, and wherein the first insulating layer overlaps with the fourth emission area.

The display device further includes: a light-blocking member disposed on the touch sensing layer and overlapping with the bank layer, wherein the light-blocking member comprises carbon black or chrome.

The display device further includes: a color filter layer disposed on the touch sensing layer and the light-blocking member, wherein the color filter layer comprises a first color filter overlapping the first emission area, a second color filter overlapping the second emission area, and a third color filter overlapping the third emission area, and wherein the color filter layer does not overlap with the fourth emission area and the light-sensing area.

The light-converting material includes quantum dots, a colorant, or a metal composite.

The touch sensing layer includes: a first touch conductive layer and a second touch conductive layer with the first insulating layer interposed therebetween, and a second insulating layer disposed on the first insulating layer, the first touch conductive layer and the second touch conductive layer, and the second insulating layer has a thickness of 5 μm to 10 μm.

According to an embodiment of the present disclosure, a first insulating layer of a touch sensing layer in a display device contains a light-converting material, so that the first insulating layer can convert light emitted from a fourth emission area into near-infrared light. Accordingly, it is possible to omit a process of fabricating an emissive layer that emits near-infrared light to light-emitting elements disposed in the fourth emission area.

In addition, the first insulating layer includes a plurality of openings overlapping the first to third emission areas emitting red, green and blue lights and a light-sensing area, thereby avoiding the transmittance of light emitted from the emission areas from decreasing to improve the accuracy of fingerprint recognition. Further, the transmittance of near-infrared light incident on the light-sensing area is prevented from decreasing thereby improving the accuracy of finger recognition.

In addition, a second insulating layer has a thickness of 5 μm to 10 μm, thereby improving resolution, which is the fingerprint sensing feature. In addition, a light-blocking member includes an inorganic light-blocking material, so that the light-blocking member can block visible light and near-infrared light, thereby improving the resolution of the display device.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which example embodiments of the disclosure are shown. This disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers may indicate the same components throughout the specification.

It will be understood that, although the terms "first," "second," etc. may be used herein to describe various elements, these elements should not be limited by these terms. These terms are simply used to distinguish one element from another element. For instance, a first element discussed below could be termed a second element. Similarly, the second element could also be termed the first element.

Each of the features of the various embodiments of the present disclosure may be combined, in part or in whole, and various interlocking and driving are possible. Each embodiment may be implemented independently of each other or may be implemented together in an association.

Figure 1:
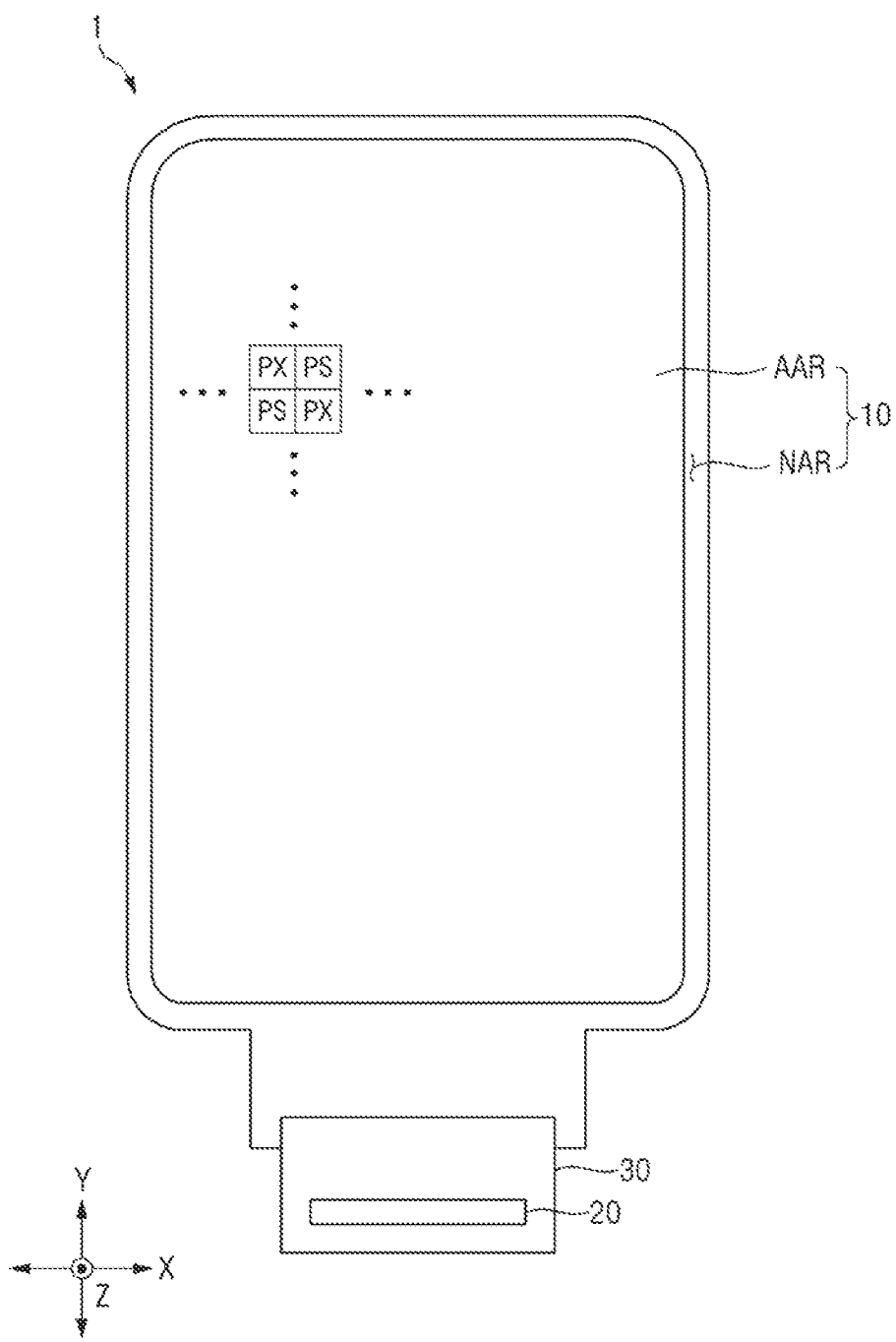
FIG. 1 is a plan view of a display device according to an embodiment of the present disclosure.

FIG. 1 is a plan view of a display device according to an embodiment of the present disclosure.

In FIG. 1, a first direction X, a second direction Y and a third direction Z are illustrated. The first direction X may refer to a direction parallel to a side of the display device 1, for example, the horizontal direction of the display device 1 when viewed from the top. A second direction Y may refer to a direction parallel to another side of the display device 1 that meet the side of the display device 1, for example, the vertical direction of the display device 1 when viewed from the top. In the following description, a first side in the first direction X indicates the right side, a second side in the first direction X indicates the left side, a first side in the second direction Y indicates the upper side, and a second side in the second direction Y indicates the lower side when viewed from the top, for convenience of illustration. The third direction Z may refer to the thickness direction of the display device 1. It should be understood that the directions referred to in the embodiments are relative directions, and the embodiments are not limited to the directions mentioned.

As used herein, the terms "top", "upper surface" and "upper side" in the third direction Z refer to the display side of a display panel 10, whereas the terms "bottom", "lower surface" and "rear side" refer to the opposite side of the display panel 10, unless stated otherwise.

Referring to FIG. 1, the display device 1 may include a variety of electronic devices that have a display screen. Examples of the display device 1 include, but are not limited to, a mobile phone, a smart phone, a tablet personal computer (PC), a mobile communications terminal, an electronic organizer, an e-book, a personal digital assistant (PDA), a portable multimedia player (PMP), a navigation device, an ultra mobile PC (UMPC), a television set, a game machine, a wristwatch-type electronic device, a head-mounted display, a personal computer monitor, a laptop computer, a vehicle instrument cluster, a digital camera, a camcorder, an outdoor billboard, an electronic billboard, various medical apparatuses, various inspection devices, various home appliances including a display area such as a refrigerator and a laundry machine, Internet of things (IoT) devices, etc.

The display device 1 may include a display panel 10, a panel driver 20 and a circuit board 30.

The display panel 10 may include an active area AAR and a non-active area NAR.

The active area AAR may include a display area where images are displayed. The active area AAR may completely overlap with the display area. A plurality of pixels PX may be disposed in the display area for displaying images. Each of the pixels PX may include an emission area EMA that emits light (see FIG. 8).

The active area AAR may further include a photo sensing area. The photo sensing area is a photosensitive area and senses the amount of incident light, the wavelength, etc. The photo sensing area may overlap with the display area. According to an embodiment of the present disclosure, the photo sensing area may completely overlap the active area AAR when viewed from the top. In this case, the photo sensing area may be identical to the display area. According to another embodiment, the photo sensing area may be disposed only in a portion of the active area AAR. For example, the photo sensing area may be disposed only in a limited area necessary for fingerprint recognition. In this case, the photo sensing area may overlap a portion of the display area DA but may not overlap another portion of the display area. For example, the photo sensing area may overlap a first portion of the display area DA but may not overlap a second portion of the display area.

A plurality of photo sensors PS that responds to light may be disposed in the photo sensing area. Each of the photo sensors PS may include a light-sensing area RA (see FIG. 8) for sensing incident light.

The non-active area NAR may surround the active area AAR. The panel driver 20 may be disposed in the non-active area NAR. The panel driver 20 may drive the plurality of pixels PX and/or the plurality of photo sensors PS. The panel driver 20 may output signals and voltages for driving the display panel 10. The panel driver 20 may be implemented as an integrated circuit (IC) and may be mounted on the display panel 10. Signal lines for transferring signals between the panel driver 20 and the active area AAR may be further disposed in the non-active area NAR. For another example, the panel driver 20 may be mounted on the circuit board 30.

The circuit board 30 may be attached to one end of the display panel 10 using an anisotropic conductive film (ACF). The circuit board 30 may be disposed in the non-active area NAR. Lead lines of the circuit board 30 may be electrically connected to the pad areas of the display panel 10. The circuit board 30 may be a flexible printed circuit board (FPCB) or a flexible film such as a chip-on-film (COF).

Figure 2:
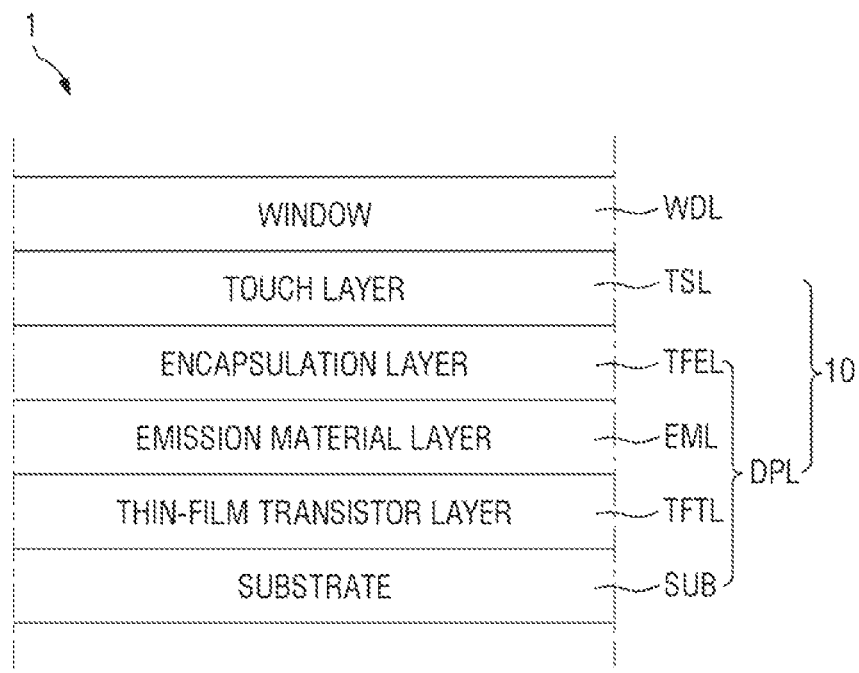
FIG. 2 is a cross-sectional view of a display device according to an embodiment of the present disclosure.

FIG. 2 is a cross-sectional view of a display device according to an embodiment of the present disclosure.

Referring to FIG. 2, the display device 1 may include a display layer DPL, a touch sensing layer TSL, and a window WDL. The display layer DPL and the touch sensing layer TSL may form the display panel 10. The display layer DPL and the touch sensing layer TSL may be in direct contact with each other. The display layer DPL may include a substrate SUB, a thin-film transistor layer TFTL, an emission material layer EML and an encapsulation layer TFEL disposed on the substrate SUB. The substrate SUB, the thin-film transistor layer TFTL, the emission material layer EML and the encapsulation layer TFEL may be stacked in sequence.

The substrate SUB may be a rigid substrate or a flexible substrate that can be bent, folded, rolled, and so on. The substrate SUB may be made of an insulating material such as glass, quartz and a polymer resin. Examples of the polymer material may include polyethersulphone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), or a combination thereof.

The thin-film transistor layer TFTL disposed on the substrate SUB may include a plurality of thin-film transistors for driving pixels, and a plurality of display signal lines. The plurality of display signal lines may include scan lines that transmit scan signals to the pixels and data lines that transmit data signals to the pixels.

Figure 9:
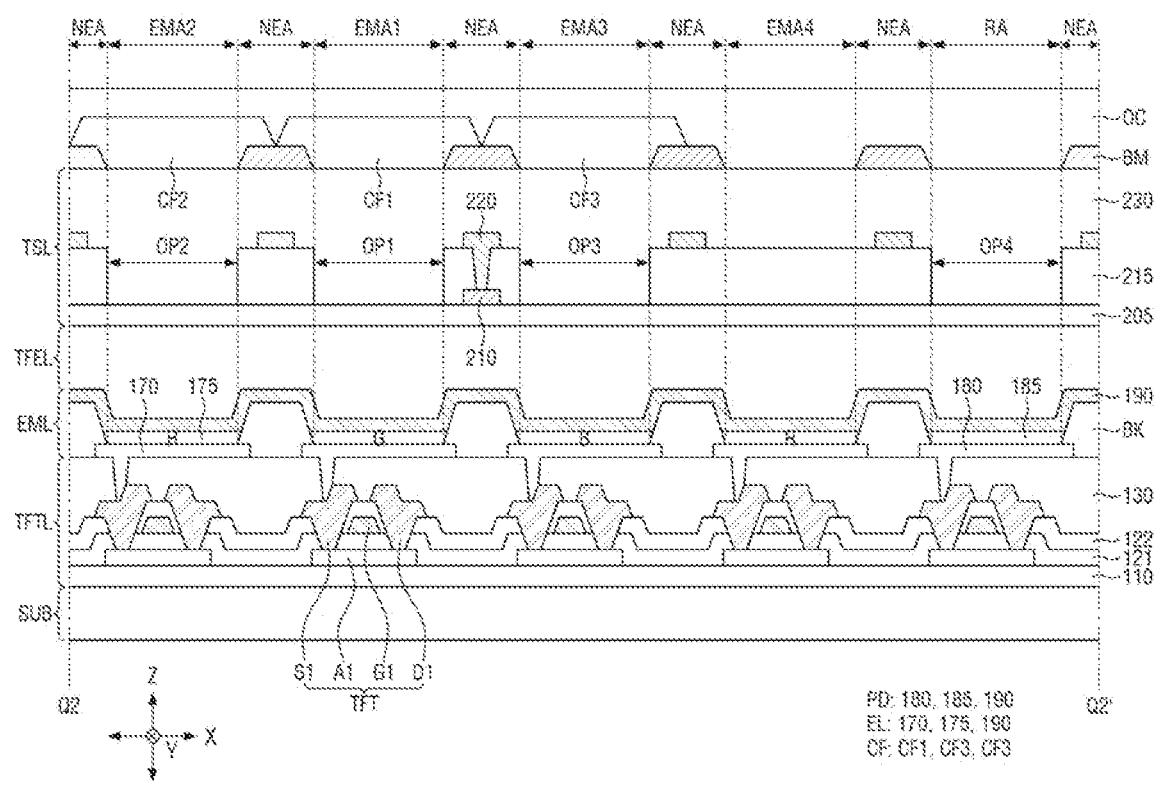
FIG. 9 is a cross-sectional view showing an example of the display device, taken along line Q2-Q2' of FIG. 8.
Figure 10:
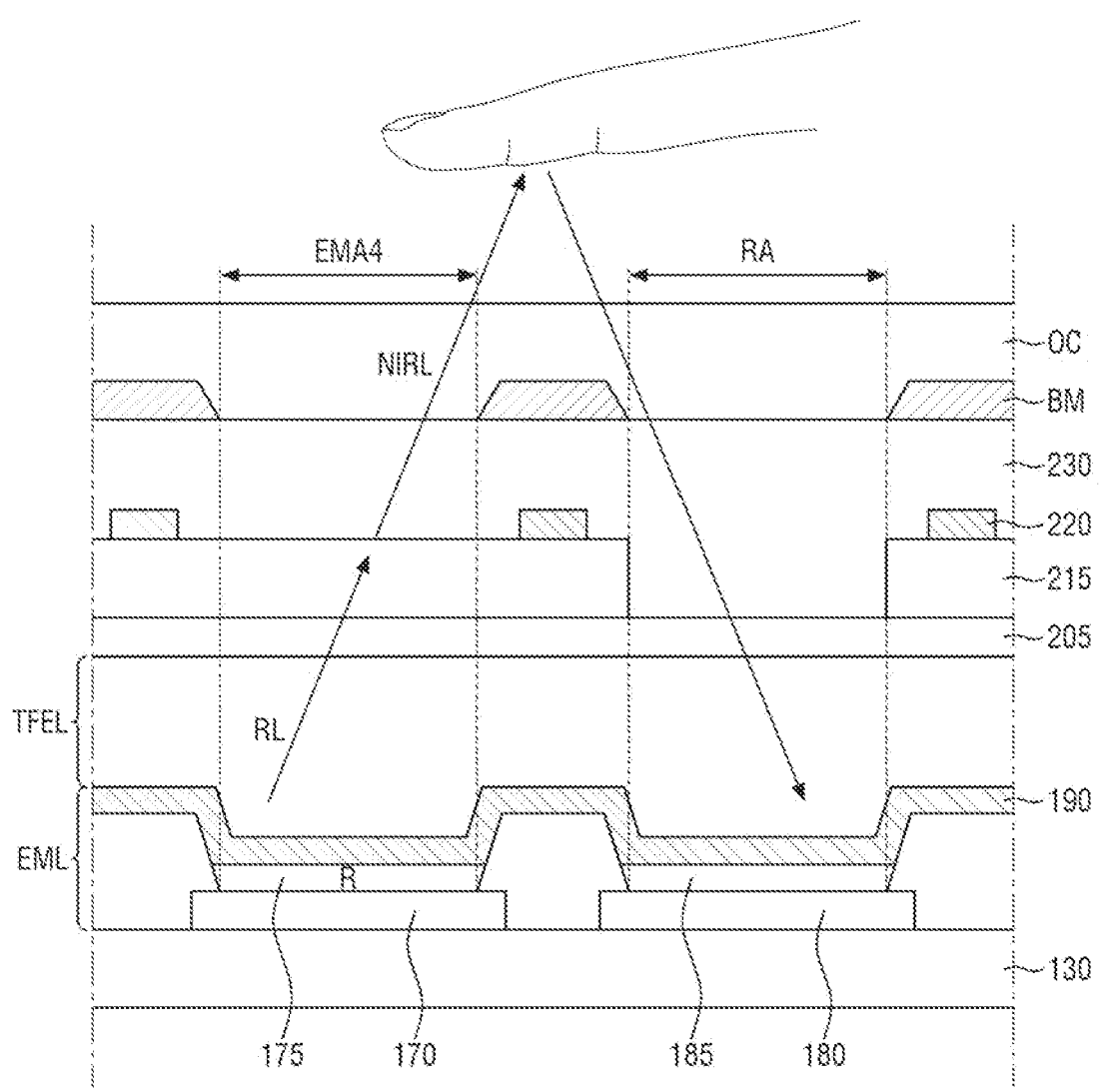
FIGS. 10 and 11 are views showing the fourth emission areas and the light-sensing areas of FIG. 9.

The emission material layer EML disposed on a surface of the thin-film transistor layer TFTL may include light-emitting elements EL (see FIG. 9) that emit light and photoelectric conversion elements PD (see FIGS. 9 and 10).

Each of the light-emitting elements EL may emit light with a predetermined luminance depending on an anode voltage and a cathode voltage applied from the thin-film transistor layer TFTL.

Each of the light-emitting elements EL may be an organic light-emitting diode including an anode electrode, a cathode electrode, and an organic emissive layer disposed between the anode electrode and the cathode electrode. Alternatively, each of the light-emitting elements may be an inorganic light-emitting element including an anode electrode, a cathode electrode, and an inorganic semiconductor disposed between the anode electrode and the cathode electrode. Alternatively, each of the light-emitting elements may be a quantum-dot light-emitting element including an anode electrode, a cathode electrode, and a quantum-dot emissive layer disposed between the anode electrode and the cathode electrode. Alternatively, each of the light-emitting elements may be a micro light-emitting diode.

Each of the photoelectric conversion elements PD may generate photocharges in proportion to the incident light. The accumulated photocharges may be converted into an electrical signal required for sensing according to the anode voltage and the cathode voltage applied from the thin-film transistor layer TFTL.

Each of the photoelectric conversion elements PD may include an anode electrode, a cathode electrode, and a photoelectric conversion layer disposed between the anode electrode and the cathode electrode. Each of the photoelectric conversion elements PD may convert incident light from the outside into an electrical signal. Each of the photoelectric conversion elements PD may be a light-receiving diode formed of a pn-type or pin-type inorganic material, or a phototransistor. Alternatively, each of the photoelectric conversion elements PD may be an organic light-receiving diode using an organic material.

The encapsulation layer TFEL may be disposed on the emission material layer EML. The encapsulation layer TFEL may include a stack of inorganic films or organic films to prevent permeation of oxygen or moisture into the light-emitting elements of the emission material layer EML.

The touch sensing layer TSL may be disposed on the encapsulation layer TFEL. The touch sensing layer TSL may include a plurality of touch electrodes IE1 and IE2 (see FIG. 5) and a plurality of signal lines TL and RL (see FIG. 5) for sensing a user's touch. The touch sensing layer TSL may detect a user's touch by self-capacitance or mutual capacitance.

The window WDL may be disposed on the touch sensing layer TSL. The window WDL may include a rigid material such as glass and quartz. The window WDL may include, for example, a window member. The window WDL may be attached on the touch sensing layer TSL using an optically clear adhesive or the like.

A polarizing film to reduce reflection of external light may be additionally disposed between the touch sensing layer TSL and the window WDL.

Figure 3:
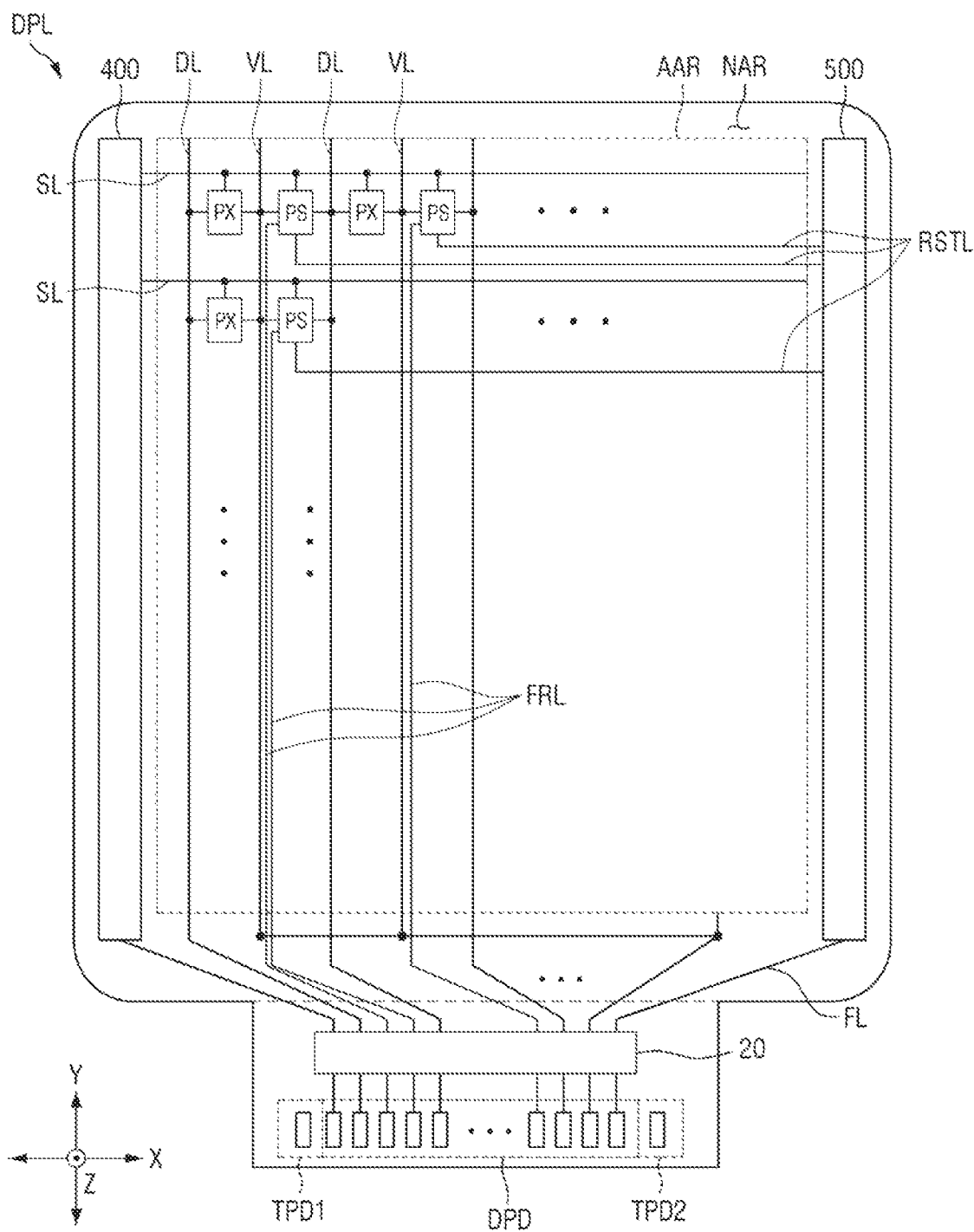
FIG. 3 is a plan view of a display layer according to an embodiment of the present disclosure.

FIG. 3 is a plan view of a display layer according to an embodiment of the present disclosure.

Referring to FIG. 3, in the active area AAR of the display layer DPL, scan lines SL and supply voltage lines VL connected to the plurality of pixels PX and the plurality of photo sensors PS, data lines DL connected to the plurality of pixels PX, and reset lines RSTL and sensing lines FRL connected to the plurality of photo sensors PS may be disposed.

The scan lines SL may supply scan signals received from a scan driver 400 to the plurality of pixels PX and the plurality of photo sensors PS. The scan lines SL may be extended in the first direction X and may be spaced apart from one another in the second direction Y.

The data lines DL may supply the data voltages received from the panel driver 20 to the plurality of pixels PX. The data lines DL may be extended in the second direction Y and may be spaced apart from one another in the first direction X.

The supply voltage lines VL may supply the supply voltage received from the panel driver 20 to the plurality of pixels PX and the plurality of photo sensors PS. Herein, the supply voltage may be at least one of a first supply voltage ELVDD, a second supply voltage ELVSS and an initialization voltage VINT. The supply voltage lines VL may be extended in the second direction X and may be spaced apart from one another in the first direction X in the active area AAR, and may be connected with one another in the non-active area NAR. The supply voltage lines VL may be adjacent to data lines DL and may be disposed between a pair of the data lines DL.

The reset lines RSTL may supply the reset signals received from a reset signal generator 500 to the plurality of photo sensors PS. The reset lines RSTL may be extended in the first direction X and may be spaced apart from one another in the second direction Y. The reset lines RSTL may be adjacent to scan lines SL and may be disposed between a pair of the scan lines SL. More than one reset line RSTL may be disposed between a pair of the scan lines SL.

The sensing lines FRL may supply electric current generated by the light charges of the photo sensors PS to a fingerprint sensing unit. The sensing lines FRL may be extended in the second direction Y and may be spaced apart from one another in the first direction X. The sensing lines FRL may be adjacent to the supply voltage lines VL.

The non-active area NAR of the display layer DPL may include the scan driver 400, fan-out lines FL, the reset signal generator 500 and the panel driver 20.

The scan driver 400 may generate a plurality of scan signals based on a scan control signal, and may sequentially supply the scan signals to the scan lines SL in a predetermined order.

The fan-out lines FL may be extended from the panel driver 20 to the active area AAR. The fan-out lines FL may supply the data voltage received from the panel driver 20 to the plurality of data lines DL. In addition, the fan-out lines FL may transfer the currents received from the sensing lines FRL to the panel driver 20.

The reset signal generator 500 may generate a plurality of reset signals based on a reset control signal, and may sequentially supply the reset signals to the plurality of reset lines RSTL in a predetermined order. The photo sensors PS connected to the reset lines RSTL may receive the reset signals. The reset signal generator 500 may be omitted.

The panel driver 20 may output signals and voltages for driving the display panel 10 to the fan-out lines FL. The panel driver 20 may supply data voltages to the data lines DL through the fan-out lines FL. The data voltages may be applied to the plurality of pixels PX, so that the luminance of the plurality of pixels PX may be determined.

The panel driver 20 may include the fingerprint sensing unit. The fingerprint sensing unit may measure the magnitude of the current of the photo sensors PS through the sensing lines FRL. The fingerprint sensing unit may generate fingerprint sensing data according to the magnitude of the current sensed by the photo sensors PS and transmit the fingerprint sensing data to a main processor. The main processor may analyze the fingerprint sensing data to determine whether the fingerprint detection data matches the user's fingerprint by comparison with a predetermined fingerprint. As another example, the fingerprint sensing unit may be implemented as a separate integrated circuit from the panel driver 20.

In addition, the panel driver 20 may supply a scan control signal to the scan driver 400 through a scan control line.

The non-active area NAR of the display layer DPL may further include a display pad area DPD and first and second touch pad areas TPD1 and TPD2. The display pad area DPD, the first touch pad area TPD1 and the second touch pad area TPD2 may be electrically connected to the circuit board 30 using a low-resistance, high-reliability material such as an anisotropic conductive film and a SAP. The display pad area DPD may include a plurality of display pads.

According to this embodiment, the scan lines SL are connected to the pixels PX as well as the photo sensors PS, but the present disclosure is not limited thereto. The types and arrangements of signal lines may be diversified. In this embodiment, the plurality of pixels PX and the plurality of photo sensors PS may be turned on/off in response to the same scan signal. Accordingly, the pattern of the fingerprint may be optically sensed while an image is displayed.

Figure 4:
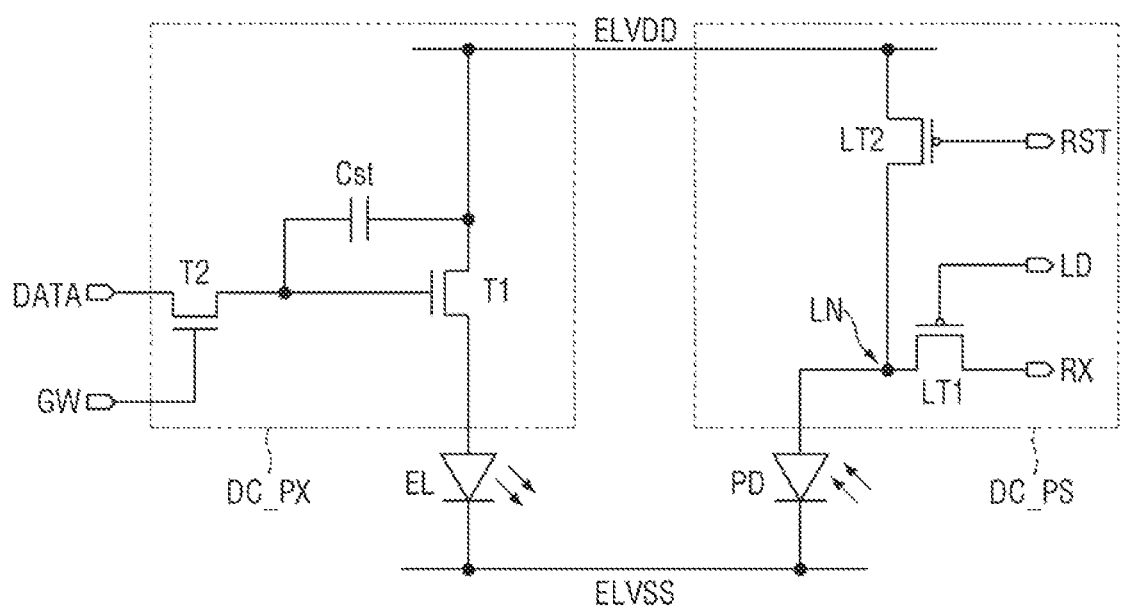
FIG. 4 is a circuit diagram of a pixel and a photo sensor in a display layer according to an embodiment of the present disclosure.

FIG. 4 is a circuit diagram of a pixel and a photo sensor in a display layer according to an embodiment of the present disclosure.

Referring to FIG. 4, the display panel 10 may include a display driving circuit DC_PX that controls the amount of light emitted by the plurality of pixels PX, and a sense driving circuit DC_PS that controls the amount of light received by the plurality of light sensors PS. The display panel 10 may apply driving signals or driving voltages to one or more transistors and various signal lines included in the display driving circuit DC_PX and the sense driving circuit DC_PS.

Figure 11:
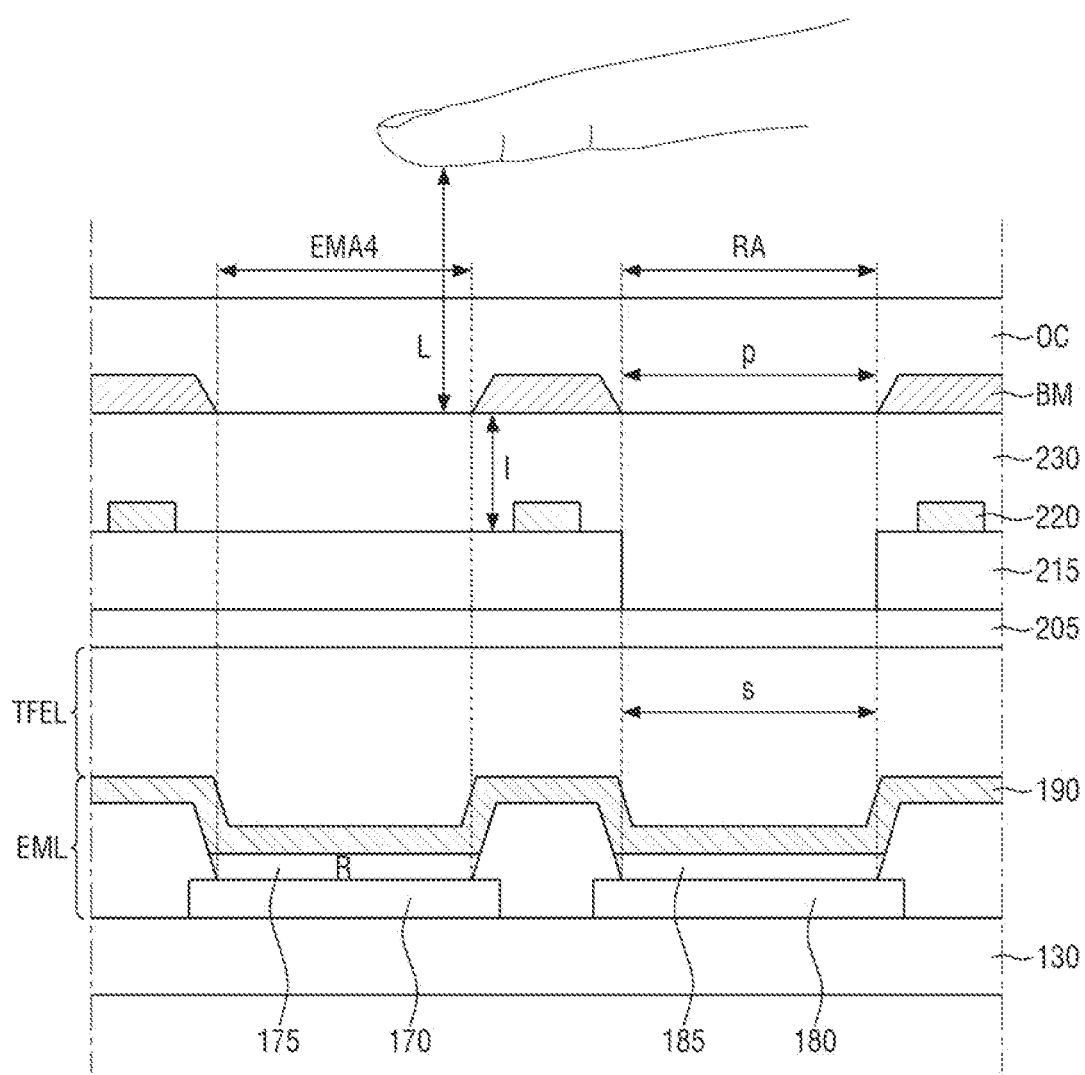

The display driving circuit DC_PX and the sense driving circuit DC_PS may be implemented as integrated circuits separately, or may be implemented as a single integrated circuit as shown in FIG. 11.

The display driving circuit DC_PX may include a light-emitting element EL, a capacitor Cst, a first transistor T1 and a second transistor T2. The display driving circuit DC_PX may receive a data signal DATA, a first scan signal GW, the first supply voltage ELVDD and the second supply voltage ELVSS. The data signal DATA may be provided through the panel driver 20 connected to the data lines DL, and the first scan signal GW may be provided through the scan driver 400 connected to the scan lines SL.

The light-emitting element EL may be an organic light-emitting diode including an anode electrode, a cathode electrode, and an emissive layer 175 (see FIG. 9) disposed between the anode electrode and the cathode electrode. The anode electrode of the light-emitting element EL is connected to the first transistor T1. The cathode electrode of the light-emitting element EL may be connected to a second supply voltage ELVSS terminal to receive the second supply voltage ELVSS. The anode electrode of the light-emitting element EL may correspond to a pixel electrode 170 of FIG. 9, and the cathode electrode thereof may correspond to a common electrode 190 of FIG. 9.

The capacitor Cst is connected between the gate electrode of the first transistor T1 and a first supply voltage ELVDD terminal. The capacitor Cst may include a first capacitor electrode connected to the gate electrode of the first transistor T1 and a second capacitor electrode connected to the first supply voltage ELVDD terminal.

The first transistor T1 may be a driving transistor, and the second transistor T2 may be a switching transistor. Each of the first and second transistors T1 and T2 may include a gate electrode, a source electrode and a drain electrode. One of the source electrode and the drain electrode may be a first electrode and the other of the source electrode and the drain electrode may be a second electrode. In the following description, an example where the drain electrode is the first electrode and the source electrode is the second electrode is described for convenience.

The first transistor T1 is a driving transistor and may generate a driving current. The gate electrode of the first transistor T1 is connected to the first capacitor electrode, a first electrode of the first transistor T1 is connected to the first supply voltage ELVDD terminal, and a second electrode of the first transistor T1 is connected to the anode electrode of the light-emitting element EL. The second capacitor electrode is connected to the first electrode of the first transistor T1. In the cross-sectional view, the first transistor T1 may be one of the thin-film transistors TFT (see FIG. 9) disposed in the thin-film transistor layer TFTL and connected to the pixel electrode 170.

The second transistor T2 is a switching transistor, and has a gate electrode connected to the first scan signal GW terminal, a first electrode connected to a data signal DATA terminal, and a second electrode connected to the second electrode of the first transistor T1. The second transistor T2 is turned on in response to the first scan signal GW to perform a switching operation of transferring the data signal DATA to the first electrode of the first transistor T1.

The capacitor Cst may be charged with a voltage corresponding to the data signal DATA received from the second transistor T2. The first transistor T1 may control the driving current flowing in the light-emitting element EL in proportion to the amount of charges stored in the capacitor Cst.

It should be noted that this is merely illustrative. The display driving circuit DC_PX may further include a compensation circuit for compensating threshold voltage deviations ΔVth of the first transistor T1.

The sense driving circuit DC_PS may include a sensing transistor LT1, a reset transistor LT2 and a photoelectric conversion element PD. In addition, a sensing node LN may be further included between the sensing transistor LT1, the reset transistor LT2 and the photoelectric conversion element PD. The sense driving circuit DC_PS may receive a fingerprint scan signal LD, a fingerprint sensing signal RX, and a reset signal RST. The fingerprint scan signal LD may be provided, but is not limited to being provided, through the scan driver 400 connected to the scan lines SL. The fingerprint sensing signal RX may be provided through the panel driver 20 (or the fingerprint sensing unit) connected to the sensing lines FRL. The reset signal RST may be provided through the reset signal generator 500 connected to the reset signal line RSTL.

The photoelectric conversion element PD may be an organic light-emitting diode or a phototransistor including an anode electrode, a cathode electrode, and a photoelectric conversion layer 185 (see FIG. 10) disposed between the anode electrode and the cathode electrode. The anode electrode of the photoelectric conversion element PD is connected to the sensing node LN. The cathode electrode of the photoelectric conversion element PD may be connected to a second supply voltage ELVSS terminal to receive the second supply voltage ELVSS. The anode electrode of the photoelectric conversion element PD may correspond to the first electrode 180 of FIG. 10, and the cathode electrode thereof may correspond to the common electrode 190.

The photoelectric conversion element PD may generate photocharges when it is exposed to external light. The generated photocharges may be accumulated in the anode electrode of the photoelectric conversion element PD. In this case, the voltage at the sensing node LN electrically connected to the anode electrode may be stepped up. When a fingerprint sensing signal RX terminal is connected to the photoelectric conversion element PD, an electric current may flow due to a voltage difference between the voltage at the sensing node LN where charges are accumulated and the voltage of the sensing line FRL.

The sensing transistor LT1 may have a gate electrode connected to the fingerprint scan signal LD terminal, a first electrode connected to the sensing node LN, and a second electrode connected to the fingerprint sensing signal RX terminal. The sensing transistor LT1 may be turned on in response to the fingerprint scan signal LD to transmit a current flowing through the photoelectric conversion element PD to the fingerprint sensing signal RX terminal. As shown in FIG. 10, the sensing transistor LT1 may be one of the thin-film transistors TFT of the thin-film transistor layer TFTL.

The reset transistor LT2 may have a gate electrode connected to the reset signal RST terminal, a first electrode connected to the first supply voltage ELVDD terminal, and a second electrode connected to the sensing node LN. In this case, the sensing node LN and the anode electrode of the photoelectric conversion element PD may be reset to the first supply voltage ELVDD.

Although the transistors are NMOS transistors in the drawings, some or all of the transistors may be implemented as PMOS transistors. For example, some of the transistors shown in FIG. 4 may be implemented as NMOS transistors while others may be implemented as PMOS transistors.

Figure 5:
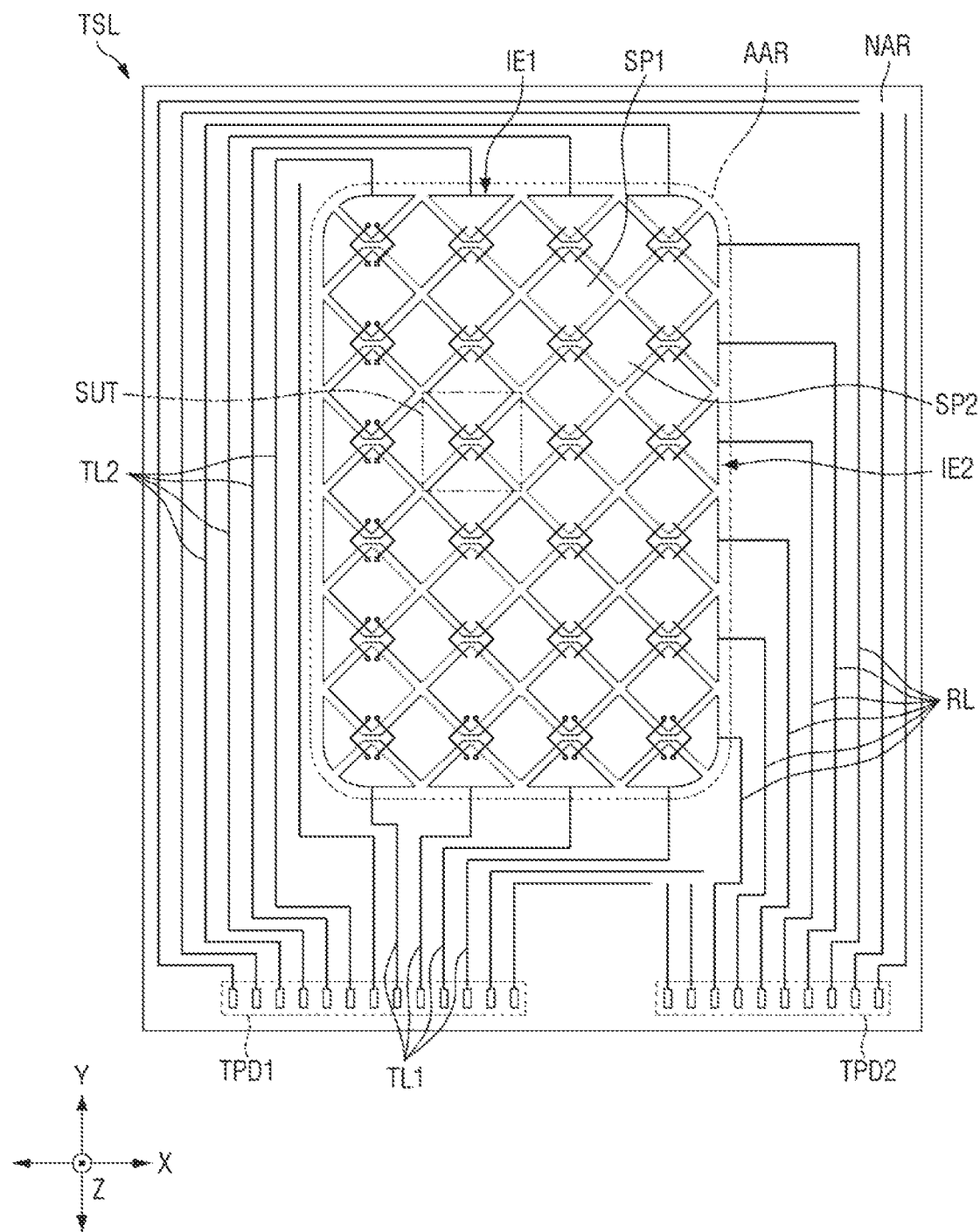
FIG. 5 is a schematic plan view of a touch sensing layer of a display panel according to an embodiment of the present disclosure.

FIG. 5 is a schematic plan view of a touch sensing layer of a display panel according to an embodiment of the present disclosure.

Referring to FIG. 5, the touch sensing layer TSL may include the active area AAR and the non-active area NAR. The active area AAR may be a touch sensing area that senses a user's touch, and the non-active area NAR may be a touch peripheral area disposed around the touch sensing area. As an example, touch may not be detected in the non-active area NAR. The touch sensing area may overlap with the display area and the light-sensing area of the display layer DPL, and the touch peripheral area may overlap with the non-display area of the display layer DPL.

The active area AAR may include a plurality of first touch electrodes IE1 and a plurality of second touch electrodes IE2. The first touch electrodes IE1 or the second touch electrodes IE2 may be driving electrodes while the others may be sensing electrodes.

According to this embodiment, the first touch electrodes IE1 are driving electrodes while the second touch electrodes IE2 are sensing electrodes. In another embodiment, the first touch electrodes IE1 are sensing electrodes while the second touch electrodes IE2 are driving electrodes.

The first touch electrodes IE1 may be extended in the second direction Y. The first touch electrodes IE1 may include a plurality of first sensor portions SP1 arranged in the second direction Y, and first connecting portions CP1 (see FIG. 6) electrically connecting between adjacent ones of the first sensor portions SP1. The plurality of first touch electrodes IE1 may be arranged in the first direction X.

The second touch electrodes IE2 may be extended in the first direction X. The second sensing electrodes IE2 may include a plurality of second sensor portions SP2 arranged in the first direction X and the second connecting portions CP2 (see FIG. 6) electrically connecting between adjacent ones of the second sensor portions SP2. The plurality of second touch electrodes IE2 may be arranged in the second direction Y.

Figure 6:
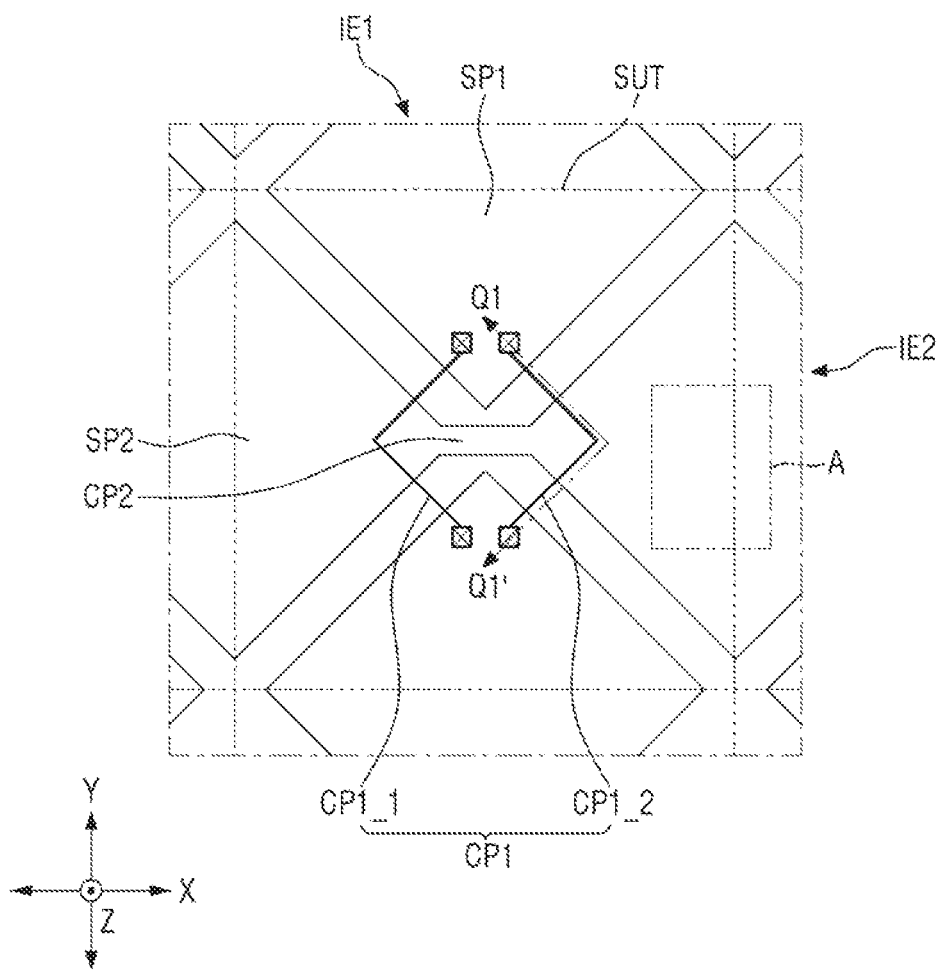
FIG. 6 is an enlarged view of a unit sensing area of FIG. 5.

FIG. 6 is an enlarged view of a unit sensing area of FIG. 5.

Referring to FIGS. 5 and 6, at least some of the first sensor portions SP1 and the second sensor portions SP2 may have a diamond shape. Some of the first sensor portions SP1 and the second sensor portions SP2 may have a truncated diamond shape. For example, each of the first and second sensor portions SP1 and SP2 at the ends in the extension direction may have a triangle shape obtained by cutting the diamond shape. The first sensor portions SP1 and the second sensor portions SP2 in the diamond or triangle shape may have substantially the same size and shape. It is, however, to be understood that the present disclosure is not limited thereto. The first sensor portions SP1 and the second sensor portions SP2 may have a variety of shapes and sizes.

Each of the first connecting portions CP1: CP1_1 and CP1_2 may connect a vertex of the diamond or triangle shape of a first sensor portion SP1 with that of an adjacent first sensor portion SP1. Each of the second connecting portions CP2 may connect a vertex of the diamond or triangle shape of a second sensor portion SP2 with that of an adjacent second sensor portion SP2. The width of the first connecting portions CP1 and the second connecting portions CP2 may be smaller than the width of the first sensor portions SP1 and the second sensor portions SP2.

The first touch electrodes IE1 and the second touch electrodes IE2 may be insulated from each other and intersect each other. The first touch electrodes IE1 are connected to one another by a conductive layer and the second touch electrodes IE2 are connected to one another by another conductive layer disposed on a different layer at the intersections, such that the first touch electrodes IE1 can be insulated from the second touch electrodes IE2. The first touch electrodes IE1 may be connected with one another by the first connecting portions CP1 while the second sensing electrodes IE2 may be connected with one another by the second connecting portions CP2, so that they may intersect each other. To insulate the first touch electrodes IE1 from the second sensing electrodes IE2 intersecting each other, the first connecting position CP1 and/or the second connecting portions CP2 may be located on a different layer from the first sensing electrodes IE1 and the second sensing electrodes IE2. The stack structure of the touch sensing layer TSL will be described with reference to FIG. 7.

The first sensor portions SP1 and the second sensor portions SP2 adjacent to each other may form a unit sensing area SUT. For example, halves of two adjacent first sensor portions SP1 and halves of two adjacent second sensor portions SP2 may form a square or a rectangle, with respect to the intersection between the first touch electrodes IE1 and the second touch electrodes IE2. The area defined by the halves of the adjacent two first sensor portions SP1 and halves of the two adjacent second sensor portions SP2 may be a unit sensing area SUT. As shown in FIG. 6, a lower half and an upper half of the two first sensor portions SP1 facing each other and a left half and a right half of the two adjacent second sensor portions SP2 facing each other constitute the unit sensing area SUT. A plurality of unit sensing areas SUT may be arranged in row and column directions.

In each of the sensing units SUT, the capacitance value between the adjacent first sensor portions SP1 and the second sensor portions SP2 is measured to determine whether or not a touch input is made, and if so, the position may be obtained as touch input coordinates. For example, a touch may be sensed by, for example, measuring mutual capacitance.

Each unit sensing area SUT may be larger than the size of a pixel. For example, each unit sensing area SUT may have an area equal to the area occupied by a plurality of pixels. The length of a side of the unit sensing area SUT may be in the range of, but is not limited to, 4 to 5 mm.

Referring to FIG. 5, a plurality of touch signal lines may be disposed in the non-active area NAR. The touch signal lines are extended from the first and second touch pad areas TPD1 and TPD2 to the non-active area NAR.

The plurality of touch signal lines may include a plurality of touch driving lines TL: TL1 and TL2 and a plurality of touch sensing lines RL. The plurality of touch signal lines may further include a touch ground line and/or a touch antistatic line.

The touch driving lines TL may be connected to the first touch electrodes IE1. In an embodiment, a plurality of touch driving lines may be connected to a single first touch electrode IE1. For example, the touch driving lines TL may include first touch driving lines TL1 connected to the lower ends of the first sensing electrodes IE1, and second touch driving lines TL2 connected to the upper ends of the first sensing electrodes IE1. The first touch driving lines TL1 may be extended from the first touch pad area TPD1 in the second direction Y and may be connected to the lower ends of the first sensing electrodes IE1. The second touch driving lines TL2 may be extended from the first touch pad area TPD1 in the second direction Y and may be extended around the left edge of the active area AAR (or the touch sensing area) to be connected to the upper ends of the first touch electrodes IE1. In this case, the second touch driving lines TL2 may be longer than the first touch driving lines TL1.

The touch sensing lines RL may be connected to the second touch electrodes IE2. In an embodiment, a single touch sensing line RL may be connected to a single second touch electrode IE2. The touch sensing lines RL may be extended from the second touch pad area TPD2 in the second direction Y and may be extended around the right edge of the active area AAR (or the touch sensing area) to be connected to the right ends of the second touch electrodes IE2.

When the first touch electrodes IE1 and the second touch electrodes IE2 are driven by mutual capacitance sensing, a driving signal is applied to the first touch electrodes IE1 through the first and second touch driving lines TL1 and TL2 to charge the capacitance formed in the unit sensing area SUT. Then, a change in the capacitance of the second touch electrodes IE2 is measured through the touch sensing lines RL to determine whether there is a touch input.

Figure 7:
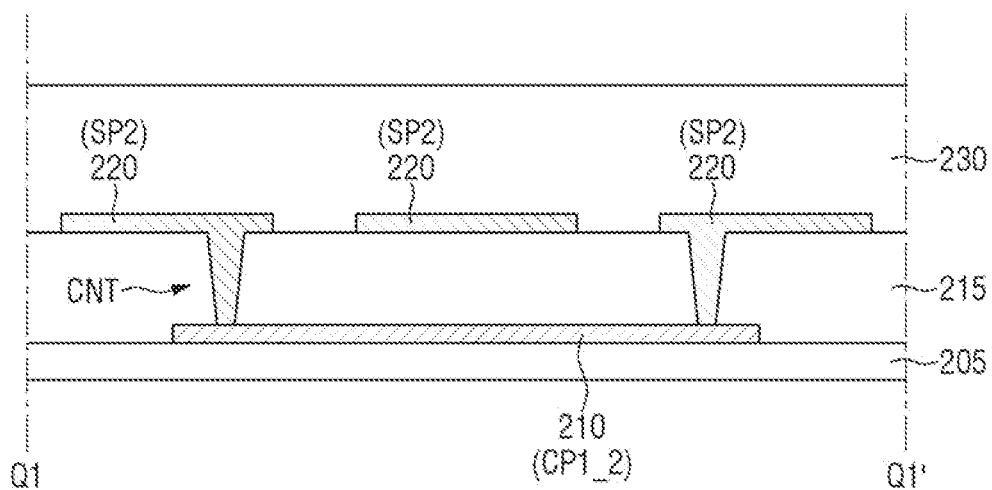
FIG. 7 is a cross-sectional view taken along line Q1-Q1' of FIG. 6.

FIG. 7 is a cross-sectional view taken along line Q1-Q1' of FIG. 6.

Referring to FIG. 7 in conjunction with FIG. 6, the touch sensing TSL may include a base layer 205, a first touch conductive layer 210 on the base layer 205, a first touch insulating layer 215 on the first touch conductive layer 210, a second touch conductive layer 220 disposed on the first touch insulating layer 215, and a second touch insulating layer 230 covering the second touch conductive layer 220. As can be seen, the touch sensing layer TSL is made up of multiple layers.

For example, the first touch conductive layer 210 may be disposed on the base layer 205. The first touch conductive layer 210 may be in direct contact with the base layer 205. The first touch conductive layer 210 is covered by the first insulating layer 215. The first insulating layer 215 also covers portions of the base layer 205. The first insulating layer 215 insulates the first touch conductive layer 210 from the second touch conductive layer 220. The second touch conductive layer 220 may be disposed on the first insulating layer 215. In this case, the first insulating layer 215 is disposed between the first touch conductive layer 210 and the second touch conductive layer 220. The second insulating layer 230 covers and protects the second touch conductive layer 220.

The base layer 205 may include an inorganic insulating material. For example, the base layer 205 may include a silicon nitride layer, a silicon oxynitride layer, a silicon oxide layer, a titanium oxide layer, or an aluminum oxide layer. The base layer 205 may be an inorganic film forming a thin-film encapsulation layer to be described later.

According to an embodiment of the present disclosure, the first connecting portions CP1 may be formed of the first touch conductive layer 210, and the first sensor portions SP1, the second sensor portions SP2 and the second connecting portions CP2 may be formed of the second touch conductive layer 220, which is disposed above the first touch conductive layer 210 with the first touch insulating layer 215 therebetween. With the above configuration, the first touch electrodes IE1 and the second touch electrodes IE2 can be reliably insulated from each other at their intersection. It should be understood, however, that the present disclosure is not limited thereto. The second connecting portions CP2 may be formed of the first touch conductive layer 210, while the first sensor portions SP1, the first connecting portions CP1 and the second sensor portions SP2 may be formed of the second touch conductive layer 220.

The first sensor portions SP1 of the first touch electrodes IE1 and the second sensor portions SP2 of the second touch electrodes IE2 may be formed in a planar pattern or a mesh pattern.

When the first sensor portions SP1 and the second sensor portions SP2 are formed as a planar pattern, the second touch conductive layer 220 forming the first sensor portions SP1 and the second sensor portions SP2 may be formed as a transparent conductive layer.

When the first sensor portions SP1 and the second sensor portions SP2 are formed in a mesh pattern, the first touch conductive layer 210 and the second touch conductive layer 220 may be made of a low-resistance material such as aluminum (Al), molybdenum (Mo), gold (Au), titanium (Ti), nickel (Ni), and copper (Cu).

According to this embodiment, the first sensor portions SP1 and the second sensor portions SP2 are formed in a mesh pattern as an example. In this case, it is possible to reduce a parasitic capacitance formed between the first touch electrode IE1 and the second touch electrode IE2 and the common electrode 190 thereunder.

The first insulating layer 215 and the second insulating layer 230 may include an organic insulating material. The first insulating layer 215 will be described in detail later.

The first insulating layer 215 may include a contact hole CNT. The first touch conductive layer 210 (e.g., the first connecting portion CP1) and a portion of the second touch conductive layer 220 (e.g., the first sensor portion SP1) may be electrically to each other through the contact hole CNT. In other words, the first connecting portion CP1 and the first sensor portion SP1 may be in direct contact with each other through the contact hole CNT.

When the first sensor portions SP1 and the second sensor portions SP2 are formed in a mesh pattern, the second touch conductive layer 220 forming the mesh pattern may be disposed on a non-emission area of the display panel. Since the second touch conductive layer 220 is disposed in the non-emission area, even if the second touch conductive layer 220 is made of an opaque, low-resistance metal, it does not hinder light emission and may not be recognized by a user.

Hereinafter, the relative arrangement of the pixels PX and the photo sensors PS of the display layer DPL and the mesh pattern of the touch sensing layer TSL according to an embodiment will be described with reference to FIG. 8.

Figure 8:
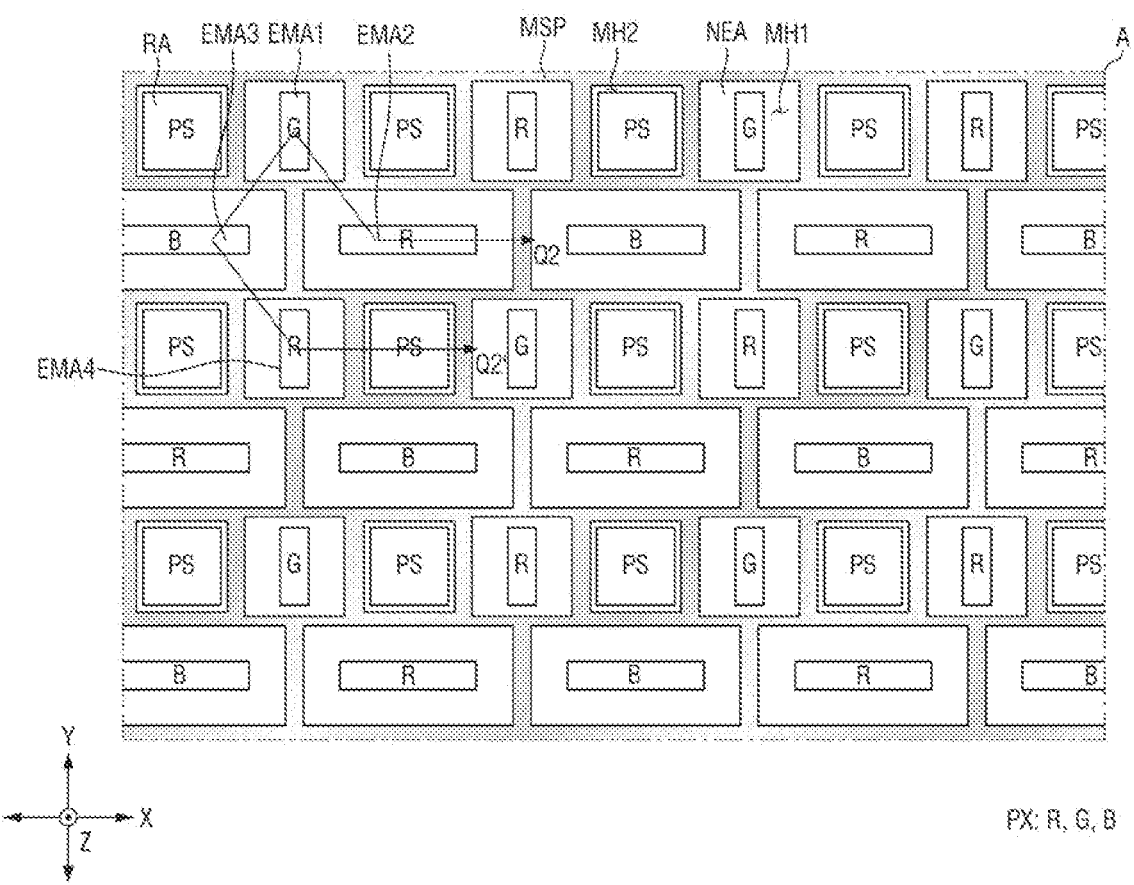
FIG. 8 is an enlarged view showing area A of FIG. 6 in detail.

FIG. 8 is an enlarged view showing area A of FIG. 6 in detail.

In FIG. 8, the display layer DPL may include a plurality of pixels PX and a plurality of photo sensors PS.

The plurality of pixels PX may include a plurality of emission areas EMA: EMA1, EMA2, EMA3 and EMA4 emitting light in the active area AAR (or display area). In the cross-sectional view, each of the plurality of emission areas EMA may be an area in which the pixel electrode 170 is exposed via an opening of a bank layer BK and the exposed pixel electrode 170 and an emissive layer 175 overlap each other.

The plurality of photo sensors PS may include a plurality of light-sensing areas RA for sensing incident light in the active area AAR. Each of the light-sensing areas RA may be an area where a first electrode 180 is exposed via an opening of the bank layer BK, and the exposed first electrode 180 and a photoelectric conversion layer 185 overlap each other.

A non-emission area may be disposed between the emission areas EMA of the pixels PX. In addition, a non-sensing area may be disposed between the light-sensing areas RA of the photo sensors PS. In the following description, an area where the non-emission area and the non-sensing area overlap each other will be referred to as a peripheral area NEA. A mesh pattern MSP may be disposed in the peripheral area NEA.

The pixels PX may include green pixels G, red pixels R, and blue pixels B. The pixels PX and the photo sensors PS may be arranged in various ways.

According to an embodiment of the present disclosure, green pixels G, red pixels R and photo sensors PS may be arranged repeatedly in a first row along the first direction X. For example, a green pixel G, a photo sensor PS, a red pixel R, a photo sensor PS and a green pixel G may be arranged in this order. In a second row next to the first row, blue pixels B and red pixels R may be alternately arranged along the first direction X. The second row may be devoid of photo sensors PS. The pixels PX belonging to the first row may be arranged in the first direction X such that they are staggered with respect to the pixels PX belonging to the second row. The first row and the second row may be repeatedly arranged up to an nth row.

The emission areas EMA of different color pixels PX may have different sizes. The emission areas of the green pixels G may be referred to as first emission areas EMA1, the emission areas of the red pixels R may be referred to as second emission areas EMA2 and fourth emission areas EMA4, and the emission areas of the blue pixels B may be referred to as third emission areas EMA3. The first emission areas EMA1 and the fourth emission areas EMA4 may be smaller than the second emission areas EMA2 or the third emission areas EMA3. In addition, the third emission areas EMA3 may be larger than the second emission areas EMA2.

Although the shape of each of the emission areas EMA of the pixels PX is a rectangular shape in the example shown in the drawings, the shape of each of the emission areas EMA is not limited thereto. The shape of each of the emission areas EMA may be an octagonal shape, a circular shape, a diamond shape, or any other polygonal shape.

The mesh pattern MSP may be disposed along the boundaries of the pixels PX and the photo sensors PS in the peripheral area NEM. The mesh pattern MSP may not overlap with the emission areas EMA or the light-sensing areas RA. The width of the mesh pattern MSP may be smaller than the width of the peripheral area NEA in one direction.

Although mesh holes MH1 and MH2 exposed by the mesh pattern MSP have a substantially rectangular shape according to the embodiment, the present disclosure is not limited thereto. The mesh holes MH1 and MH2 may not overlap with the emission areas EMA and the light-sensing areas RA. The mesh holes MH1 and MH2 may include first mesh holes MH1 and second mesh holes MH2.

The first mesh holes MH1 may expose the plurality of emission areas EMA, respectively. In other words, the areas defined by the first mesh holes MH1 may include the emission areas EMA. Each of the first mesh holes MH1 may overlap with the emissive layer 175 and a portion of the bank layer BK of the emission area EMA. The first mesh holes MH1 may have the same size (or width in the horizontal direction), but may have different sizes depending on the sizes of the emission areas EMA exposed by the first mesh holes MH1. For example, since the first emission areas EMA1 are smaller than the second emission areas EMA2, the size of the first mesh holes MH1 exposing the first emission areas EMA1 may be smaller than the size of the first mesh holes MH1 exposing the second emission areas EMA2.

The second mesh holes MH2 may expose the plurality of light-sensing areas RA, respectively. In other words, the areas defined by the second mesh holes MH2 may include the emission areas EMA. The second mesh holes MH2 may overlap the photoelectric conversion layer 185 of the light-sensing areas RA and a portion of the bank layer BK. The second mesh holes MH2 may have the same size (or width in the horizontal direction), but may have different sizes depending on the sizes of the light-sensing areas RA exposed by the second mesh holes MH2.

The mesh pattern MSP may be disposed closer to the emission areas EMA than to the light-sensing areas RA. Accordingly, some of the light that is emitted from the first emission areas EMA1 and reflected off the lower surface of the mesh pattern MSP (or the first and second touch electrodes IE1 and IE2) having an emission angle are not incident on the light-sensing areas RA. The light may be incident on the bank layer BK adjacent to the light-sensing areas RA.

If light reflected from the lower surfaces of the first and second touch electrodes IE1 and IE2 is incident on the light-sensing area RA, it acts as noise of the fingerprint sensing signal. According to this embodiment, since the mesh pattern MSP is disposed closer to the emission areas EMA than to the light-sensing areas RA, it is possible to prevent noise light from being incident on the light-sensing areas RA. Accordingly, noise of the fingerprint sensing signal can be reduced, and the accuracy of the fingerprint sensing signal provided by light reflected by the fingerprint can be improved.

The mesh pattern MSP may include a plurality of the first and second touch electrodes IE1 and IE2. In addition, the mesh holes MH1 and MH2 may be located between the plurality of the first and second touch electrodes IE1 and IE2 and may not overlap with the plurality of the first and second touch electrodes IE1 and IE2.

This embodiment may also be applied to the touch sensing layer TSL in a plane pattern. In such case, the mesh pattern MSP may be referred to as the first and second touch electrodes IE1 and IE2, and the first mesh holes MH1 and the second mesh holes MH2 may be referred to as first holes and second holes.

Figure 12:
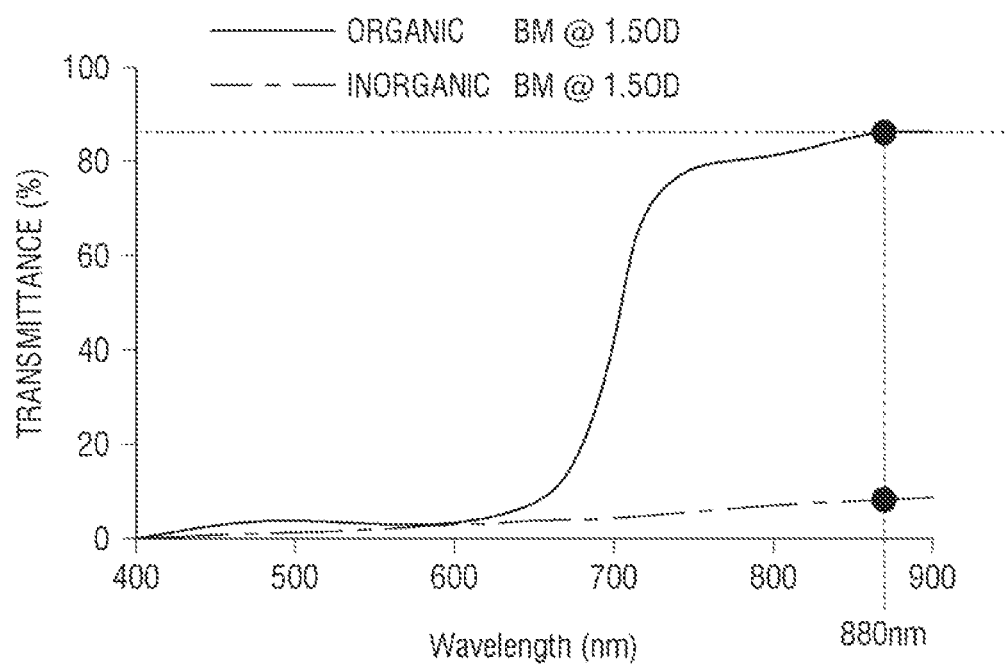
FIG. 12 is a graph showing the transmittance versus the wavelength range of light for different materials of the light-blocking material.

FIG. 9 is a cross-sectional view showing an example of the display device, taken along line Q2-Q2' of FIG. 8. FIGS. 10 and 11 are views showing the fourth emission areas and the light-sensing areas of FIG. 9. FIG. 12 is a graph showing the transmittance versus the wavelength range of light for different materials of the light-blocking material.

Referring to FIG. 9, a barrier layer 110 may be disposed on the substrate SUB. The buffer layer 110 may include silicon nitride, silicon oxide, silicon oxynitride, or the like.

A plurality of thin-film transistors TFTs may be disposed on the buffer layer 110. Each of the thin-film transistors TFT may include a semiconductor layer A1; a gate insulator 121 disposed on a portion of the semiconductor layer A1; a gate electrode G1 disposed on the gate insulator 121; an interlayer dielectric layer 122 covering the semiconductor layer A1 and the gate electrode G1, and a source electrode S1 and a drain electrode D1 disposed on the interlayer dielectric layer 122.

The semiconductor layer A1 may form a channel of the thin-film transistor TFT. The semiconductor layer A1 may include polycrystalline silicon. According to another embodiment, the semiconductor layer A1 may include monocrystalline silicon, low-temperature polycrystalline silicon, amorphous silicon, or an oxide semiconductor. The oxide semiconductor may include, for example, a binary compound (ABx), a ternary compound (ABxCy) and a quaternary compound (ABxCyDz) containing indium, zinc, gallium, tin, titanium, aluminum, hafnium (Hf), zirconium (Zr), magnesium (Mg), etc. Each semiconductor layer A1 may include a channel region, as well as a source region and a drain region doped with impurities.

The gate insulator 121 may be disposed on the semiconductor layer A1. The gate insulator 121 may electrically insulate the gate electrode G1 from the semiconductor layer A1. The gate insulator 121 may be made of an insulating material, for example, silicon oxide (SiOx), silicon nitride (SiNx), metal oxide, etc.

The gate electrode G1 of the thin-film transistor TFT may be disposed on the gate insulator 121. The gate electrode G1 may be formed above the channel region of the semiconductor layer A1 such that it overlaps with the channel region on the gate insulator 121.

The interlayer dielectric layer 122 may be disposed on the gate electrode G1. The interlayer dielectric layer 122 may include inorganic insulating materials such as silicon oxide (SiOx), silicon nitride (SiNx), silicon oxynitride, hafnium oxide and aluminum oxide. In addition, the interlayer dielectric layer 122 may include a plurality of insulating films.

The source electrode S1 and the drain electrode D1 may be disposed on the interlayer dielectric layer 122. The source electrode S1 of the thin-film transistor TFT may be electrically connected to a source region of the semiconductor layer A1 through a contact hole penetrating the interlayer dielectric layer 122 and the gate insulator 121. The drain electrode D1 of the thin-film transistor TFT may be electrically connected to a drain region of the semiconductor layer A1 through another contact hole penetrating the interlayer dielectric layer 122 and the gate insulator 121. The source electrode S1 and the drain electrode D1 may include at least one metal selected from the group consisting of: aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

A planarization layer 130 may be disposed over the thin-film transistor TFT. The planarization layer 130 may be disposed on the interlayer dielectric layer 122 to cover the source electrode S1 and the drain electrode D1. The planarization layer 130 may be made of an organic insulating material, etc. The planarization layer 130 may have a flat upper surface and may include contact holes exposing the source electrodes S1 or the drain electrodes D1.

The emission material layer EML may be disposed on the planarization layer 130. The emission material layer EML may include light-emitting elements EL, photoelectric conversion elements PD, and a bank layer BK. A light-emitting element EL may include a pixel electrode 170, an emissive layer 175, and a common electrode 190. A photoelectric conversion element PD may include a first electrode 180, a photoelectric conversion layer 185, and the common electrode 190.

The pixel electrode 170 of the light-emitting element EL may be disposed on the planarization layer 130. The pixel electrode 170 may be disposed in each pixel PX. The pixel electrode 170 may be connected to the source electrode S1 or the drain electrode D1 of the thin-film transistor TFT through a contact hole penetrating through the planarization layer 130.

The pixel electrode 170 of the light-emitting element EL may have, but is not limited to, a single-layer structure of molybdenum (Mo), titanium (Ti), copper (Cu) or aluminum (Al), or may have a stack of multiple films, e.g., a multi-layer structure of ITO/Mg, ITO/MgF, ITO/Ag and ITO/Ag/ITO including indium-tin-oxide (ITO), indium-zinc-oxide (IZO), zinc oxide (ZnO), indium oxide (In$_2$O$_3$), and silver (Ag), magnesium (Mg), aluminum (Al), platinum (Pt), lead (Pb), gold (Au) and nickel (Ni).

The first electrode 180 of the photoelectric conversion element PD may also be disposed on the planarization layer 130. For example, the first electrode 180 of the photoelectric conversion element PD may be in direct contact with the planarization layer 130. The first electrode 180 may be provided for each of the photo sensors PS. The first electrode 180 may be connected to the source electrode S1 or the drain electrode D1 of the thin-film transistor TFT through a contact hole penetrating through the planarization layer 130.

The first electrode 180 of the photoelectric conversion element PD may have, but is not limited to, a single-layer structure of molybdenum (Mo), titanium (Ti), copper (Cu) and aluminum (Al), or a multi-layer structure of ITO/Mg, ITO/MgF, ITO/Ag and ITO/Ag/ITO.

The bank layer BK may be disposed on the pixel electrode 170 and the first electrode 180. The bank layer BK may overlap a portion of the pixel electrode 170 and have an opening exposing the pixel electrode 170. In this case, the bank layer BK may correspond to a pixel defining layer. The regions where the exposed pixel electrode 170 and the emissive layer 175 overlap each other may be referred to as the first to fourth emission areas EMA1, EMA2, EMA3 and EMA4 depending on the color pixels R, G and B included in the pixels PX.

In addition, the bank layer BK may overlap the first electrode 180 and have an opening exposing the first electrode 180. The opening exposing the first electrode 180 may provide a space in which the photoelectric conversion layer 185 of each of the photo sensors PS is formed, and the area where the exposed first electrode 180 and the photoelectric conversion layer 185 overlap each other may be referred to as a light-sensing area RA.

The bank layer BK may include an organic insulating material such as polyacrylate resin, epoxy resin, phenolic resin, polyamide resin, polyimide resin, unsaturated polyesters resin, poly phenylen ether resin, poly phenylene sulfide resin, and benzocyclobutene (BCB). As another example, the bank layer BK may include an inorganic material such as silicon nitride.

The emissive layer 175 may be disposed on the pixel electrode 170 of the light-emitting element EL exposed by the opening of the bank layer BK. The emissive layer 175 may include a high-molecular material or a low-molecular material, and may emit red, green or blue light from the color pixel R, G or B included in the pixels PX. The light emitted from the emissive layer 175 may contribute to image display or function as a light source incident on the photo sensors PS. For example, a light source of a red wavelength emitted from the fourth emission area of a red pixel R may function as a light source incident on the light-sensing area of a photo sensor PS.

When the emissive layer 175 is formed of an organic material, a hole injecting layer and a hole transporting layer may be disposed under each emissive layer 175, and an electron injecting layer and an electron transporting layer may be disposed on each emissive layer 175. These layers under and on the emissive layer 175 may have a single-layer or multi-layer structure including an organic material.

The photoelectric conversion layer 185 may be disposed on the first electrode 180 of the photoelectric conversion element PD exposed by the opening of the bank layer BK. The photoelectric conversion layer 185 may generate photocharges in proportion to the incident light. The incident light may be light that was emitted from the emissive layer 175, was reflected and entered, or may be light provided from the outside irrespective of the emissive layer 175. Charges generated and accumulated in the photoelectric conversion layer 185 may be converted into electrical signals required for sensing.

The photoelectric conversion layer 185 may include electron donors and electron acceptors. The electron donors may generate donor ions in response to light, and the electron acceptors may generate acceptor ions in response to light. When the photoelectric conversion layer 185 is formed of an organic material, the electron donors may include, but are not limited to, a compound such as subphthalocyanine (SubPc) and dibutylphosphate (DBP). The electron acceptors may include, but are not limited to, a compound such as fullerene, a fullerene derivative, and perylene diimide.

Alternatively, when the photoelectric conversion layer 185 is formed of an inorganic material, the photoelectric conversion element PD may be a p-n junction or pin-type phototransistor. For example, the photoelectric conversion layer 185 may have a structure in which an n-type semiconductor layer, an i-type semiconductor layer, and a p-type semiconductor layer are sequentially stacked on one another.

When the photoelectric conversion layer 185 is formed of an organic material, a hole injecting layer and a hole transporting layer may be disposed under each photoelectric conversion layer, and an electron injecting layer and an electron transporting layer ETL may be disposed on it. These layers under and on the photoelectric conversion layer 185 may have a single-layer or multi-layer structure including an organic material.

A light-sensing area RA may receive the near-infrared light that was generated from the fourth emission areas EMA4 of the adjacent red pixel R and then converted in the first insulating layer 215, to be described later. It should be understood, however, that the present disclosure is not limited thereto.

Although the areas where the emissive layer 175 and the photoelectric conversion layer 185 are disposed are substantially identical to those of the emission areas EMA and the light-sensing areas RA, respectively, in the foregoing description, the emissive layer 175 may be disposed to cover the bank layer BK beyond the emission areas EMA, and the photoelectric conversion layer 185 may be disposed to cover the bank layer BK beyond the light-sensing area RA.

The common electrode 190 may be disposed on the emissive layer 175, the photoelectric conversion layer 185 and the bank layer BK. The common electrode 190 may be disposed across the plurality of pixels PX and the photo sensors PS such that it covers the emissive layer 175, the photoelectric conversion layer 185 and the bank layer BK. The common electrode 190 may include, a conductive material having a low work function, for example, Li, Ca, LiF/Ca, LiF/Al, Al, Mg, Ag, Pt, Pd, Ni, Au, Nd, Ir, Cr, BaF, Ba, or a compound or mixture thereof, (e.g., a mixture of Ag and Mg). Alternatively, the common electrode 190 may include a transparent metal oxide, for example, indium-tin-oxide (ITO), indium-zinc-oxide (IZO), zinc oxide (ZnO), etc.

Although not limited thereto, the photoelectric conversion element PD and the light-emitting element EL may share the common electrode 190 disposed on the photoelectric conversion layer 185 and the emissive layer 175.

An encapsulation layer TFEL may be disposed on the emission material layer EML. The encapsulation layer TFEL may include at least one inorganic film to prevent permeation of oxygen or moisture into each of the emissive layer 175 and the photoelectric conversion layer 185. In addition, the encapsulation layer TFEL may include at least one organic film to protect the emissive layer 175 and the photoelectric conversion layer 185 from particles such as dust. For example, the encapsulation layer TFEL may be formed in a structure in which a first inorganic film, an organic film, and a second inorganic film are sequentially stacked on one another. The first inorganic film and the second inorganic film may include multiple films in which one or more inorganic films of a silicon nitride layer, a silicon oxynitride layer, a silicon oxide layer, a titanium oxide layer and an aluminum oxide layer are alternately stacked on one another. The organic film may be an acryl resin, an epoxy resin, a phenolic resin, a polyamide resin or a polyimide resin.

On the encapsulation layer TFEL, the base layer 205, the first touch conductive layer 210, the first insulating layer 215, the second touch conductive layer 220 and the second insulating layer 230 of the touch sensing layer TSL may be sequentially disposed.

The first touch conductive layer 210 may overlap with the bank layer BK and may be disposed in the peripheral area NEA. For example, the first touch conductive layer 210 may overlap with the bank layer BK with the common electrode 190 therebetween. The first touch conductive layer 210 may form the mesh pattern MSP of the first and second touch electrodes IE1 and IE2 and may not overlap with the emission areas EMA or the light-sensing areas RA. Accordingly, the first touch conductive layer 210 does not interfere with light emission and is not seen by a user.

The second touch conductive layer 220 may overlap with the bank layer BK and may be disposed in the peripheral area NEA. The second touch conductive layer 220 may form the mesh pattern MSP of the first and second touch electrodes IE1 and IE2 and may not overlap with the emission areas EMA or the light-sensing areas RA. Accordingly, the second touch conductive layer 210 does not interfere with light emission and is not seen by a user.

The first insulating layer 215 may insulate the first touch conductive layer 210 from the second touch conductive layer 220 and may convert light emitted from the fourth emission area EMA4 into light in the near-infrared wavelength range. For example, the first insulating layer 215 may include an organic insulating material and may include a light-converting material that converts light emitted from the fourth emission area EMA4 into near-infrared light.

The first insulating layer 215 may include the light-converting material dispersed in an organic insulating material. The organic insulating material may be a polymeric material. For example, the first insulating layer 215 may be prepared using an insulating layer composition including a binder, a photoinitiator, a multifunctional monomer, a cross-linking agent, a surfactant, a light-converting material, and a solvent.

The binder can adjust the viscosity of the composition to improve adhesion to the substrate (or base layer 205), can facilitate the development and can improve the reactivity of the pattern. The binder may be an acrylic resin, and may be an epoxy acrylic resin in an embodiment.

The polyfunctional monomer may cause a polymerization reaction upon exposure to form a pattern. The polyfunctional monomer may include monofunctional esters of methacrylic acid having at least one ethylenically unsaturated double bond, polyfunctional esters of methacrylic acid having at least one ethylenically unsaturated double bond, or a combination thereof.

According to an embodiment of the present disclosure, the polyfunctional monomer may include ethylene glycol dimethacrylate, diethylene glycol dimethacrylate, triethylene glycol dimethacrylate, propylene glycol dimethacrylate, neopentyl glycol dimethacrylate, 1,4-butanediol dimethacrylate, 1,6-hexanediol dimethacrylate, bisphenol-A dimethacrylate, pentaerythritol dimethacrylate, pentaerythritol trimethacrylate, pentaerythritol tetramethacrylate rate, pentaerythritol hexamethacrylate, dipentaerythritol dimethacrylate, dipentaerythritol trimethacrylate, dipentaerythritol pentamethacrylate, dipentaerythritol hexamethacrylate, bisphenol-A epoxy methacrylate, ethylene glycol monomethyl ether methacrylate, trimethylol propane trimethacrylate, trismethacryloyloxyethyl phosphate, novolacepoxy methacrylate, or a combination thereof.

The photoinitiator may initiate polymerization of the multifunctional monomer by wavelengths such as visible light, ultraviolet light, and far ultraviolet light. The composition may include a photoinitiator to have a high photocurability.

The photoinitiator may include an oxime-based compound, an acetophenone-based compound, a thioxanthone-based compound, a benzophenone-based compound, or a combination thereof.

The oxime-based compound may include, for example, 1,2-octanedione, 2-dimethylamino-2-(4-methylbenzyl)-1-(4-morpholin-4-yl-phenyl)-butan-1-one, 1-(4-phenylsulfanyl) phenyl)-butane-1,2-dione-2-oxime-O-benzoate, 1-(4-phenylsulfanylphenyl)-octane-1,2-dione-2-oxime-O-benzoate, 1-(4-phenylsulfanylphenyl)-octane-1-oneoxime-O-acetate, 1-(4-phenylsulfanylphenyl)-butan-1-one-2-oxime-O-acetate, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, or a combination thereof.

The acetophenone-based compound may include, for example, 4-phenoxy dichloroacetophenone, 4-t-butyl dichloroacetophenone, 4-t-butyl trichloroacetophenone, 2,2-diethoxyacetophenone, 2-hydroxy-2-methyl-1-phenyl-propane-1-one, 1-(4-isopropylphenyl)-2-hydroxy-2-methyl-propan-1-one, 1-(4-dodecylphenyl)-2-hydroxy-2-methylpropan-1-one, 4-(2-hydroxyethoxy)-phenyl-(2-hydroxy-2-propyl) ketone, 1-hydroxy cyclohexyl phenyl ketone and 2-methyl-1-[4-(methylthio)phenyl]-2-morpholino-propan-1-one, or a combination thereof.

The thioxanthone-based compound may include, for example, thioxanthone, 2-chlorothioxanthone, 2-methylthioxanthone, isopropyl thioxanthone, 2,4-diethyl thioxanthone, 2,4-diisopropyl thioxanthone, or a combination thereof.

The benzophenone-based compound may include, for example, benzophenone, benzoyl benzoic acid, benzoyl benzoic acid methyl ester, 4-phenyl benzophenone, hydroxybenzophenone, 4-benzoyl-4'-methyl diphenyl sulfide, 3,3'-dimethyl-4-methoxy benzophenone, or a combination thereof.

The crosslinking agent combines with a binder resin to crosslink the binder resin. Examples of the crosslinking agent may include, for example, alkoxymethylated amino resins such as alkoxymethylated urea resins, alkoxymethylated melamine resins, alkoxymethylated uron resins and alkoxymethylated glycoluril resins; alkyl-etherified melamine resin, benzoguanamine resin, alkyl-etherified benzoguanamine resin, urea resin, alkyl-etherified urea resin, urethane-formaldehyde resin, resol type phenol formaldehyde resin, alkyl etherified resol type phenol formaldehyde resin, epoxy resin, etc. These may be used alone or in combination of two or more.

In addition, as the crosslinking agent, a silane coupling agent having a reactive substituent such as a carboxyl group, a methacrylic group, an isocyanate group and an epoxy group may be used. For example, examples of the crosslinking agent may include γ-methacryloxypropyltrimethoxysilane, vinyltriacetoxysilane, vinyltrimethoxysilane, γ-isocyanatepropyltriethoxysilane, γ-glycidoxypropyltrimethoxysilane, β-(3,4-epoxy cyclohexyl)ethyltrimethoxysilane, etc. These may be used alone or in combination of two or more.

Surfactants can improve the adhesion of the composition to the substrate (or the base layer 205). Examples of the surfactants may include fluorine-containing surfactants, nonionic surfactants, cationic surfactants, anionic surfactants, and silicone surfactants. These may be used alone or in combination of two or more.

The solvent may be a material that is compatible with the binder, the photoinitiator, the multifunctional monomer and the crosslinking agent but does not react with them.

The solvent may be a compound, for example, alcohols such as methanol and ethanol; ethers such as dichloroethyl ether, n-butyl ether, diisoamyl ether, methylphenyl ether and tetrahydrofuran; glycol ethers such as ethylene glycol methyl ether, ethylene glycol ethyl ether and propylene glycol methyl ether; cellosolve acetates such as methyl cellosolve acetate, ethyl cellosolve acetate and diethyl cellosolve acetate; carbitols such as methylethyl carbitol, diethyl carbitol, diethylene glycol monomethyl ether, diethylene glycol monoethyl ether, diethylene glycol dimethyl ether, diethylene glycol methyl ethyl ether and diethylene glycol diethyl ether; propylene glycol alkyl ether acetates such as propylene glycol methyl ether acetate, propylene glycol monoethyl ether acetate and propylene glycol propyl ether acetate; aromatic hydrocarbons such as toluene and xylene; ketones such as methyl ethyl ketone, cyclohexanone, 4-hydroxy-4-methyl-2-pentanone, methyl-n-propyl ketone, methyl-n-butyl kenone, methyl-n-amyl ketone, and 2-heptanone; saturated aliphatic monocarboxylic acid alkyl esters such as ethyl acetate, n-butyl acetate and isobutyl acetate; lactic acid alkyl esters such as methyl lactate and ethyl lactate; hydroxyacetic acid alkyl esters such as methyl hydroxyacetate, ethyl hydroxyacetate and butyl hydroxyacetate; acetic acid alkoxyalkyl esters such as methoxymethyl acetate, methoxyethyl acetate, methoxybutyl acetate, ethoxymethyl acetate and ethoxyethyl acetate; 3-hydroxypropionic acid alkyl esters such as methyl 3-hydroxypropionate and ethyl 3-hydroxypropionate; 3-alkoxypropionic acid alkyl esters such as methyl 3-methoxypropionate, ethyl 3-methoxypropionate, ethyl 3-ethoxypropionate and methyl 3-ethoxypropionate; 2-hydroxypropionic acid alkyl esters such as methyl 2-hydroxypropionate, ethyl 2-hydroxypropionate and propyl 2-hydroxypropionate; 2-alkoxypropionic acid alkyl esters such as methyl 2-methoxypropionate, ethyl 2-methoxypropionate, ethyl 2-ethoxypropionate and methyl 2-ethoxypropionate; 2-hydroxy-2-methylpropionic acid alkyl esters such as methyl 2-hydroxy-2-methylpropionate and ethyl 2-hydroxy-2-methylpropionate; 2-alkoxy-2-methylpropionic acid alkyl esters such as methyl 2-methoxy-2-methylpropionate and ethyl 2-ethoxy-2-methylpropionate; esters such as 2-hydroxyethyl propionate, 2-hydroxy-2-methylethyl propionate, hydroxyethyl acetate and methyl 2-hydroxy-3-methylbutanoate; or ketonic acid esters such as ethyl pyruvate. In addition, the solvent may include N-methylformamide, N,N-dimethylformamide, N-methylformanilide, N-methylacetamide, N,N-dimethylacetamide, N-methylpyrrolidone, dimethyl sulfoxide, benzylethyl ether, di-hexyl ether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, or a combination thereof.

According to another embodiment, the solvent may include glycol ethers such as ethylene glycol monoethyl ether; ethylene glycol alkyl ether acetates such as ethyl cellosolve acetate; esters such as 2-hydroxyethyl propionate; diethylene glycols such as diethylene glycol monomethyl ether; propylene glycol alkyl ether acetates such as propylene glycol monomethyl ether acetate and propylene glycol propyl ether acetate; or a combination thereof.

The above-described insulating layer composition may include a light-converting material that converts light emitted from the fourth emission area EMA4 into near-infrared light (NIR).

The light-converting material may be at least one of a quantum dot, a colorant, or a metal composite. As used herein, a colorant encompasses a dye as well as a pigment.

Quantum dots can adjust the wavelength band of emitted light depending on the particle size. According to this embodiment, the quantum dots may use a material that converts red, blue or green light into light in a near-infrared wavelength range. Quantum dots may have a single core structure of, for example, Si, Ge, PbS, PbSe, PbTe, InSb, $Cd_3P_2$, $Ag_2S$, $Ag_2Se$, HgTe, $CuInS_2$, $SuInSe_2$, $AgInSe_2$, $AgBiS_2$, $CsSnI_3$ or $FAPbI_3$, or a core/shell structure of CdTe/CdS, InAs/CdSe/CdS, HgSe/CdS, $CuInS_2$/ZnS or $CuInSe_2$/ZnS. The content of quantum dots may range from 20 to 40 wt % with respect to the total solid content of the composition.

As the colorant, a material that converts red light into light in the near-infrared wavelength range may be used. The colorant may be an organic dye or pigment. For example, the colorant may include cyanine, squaraine, rhodamine, phthalocyanine, etc.

As an example of cyanine, a material represented by the following chemical formula may be used:

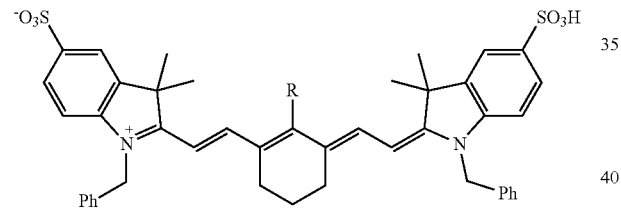

where R may be Cl or

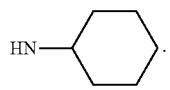

As an example of squaraine, materials represented by the following chemical formulas may be used:

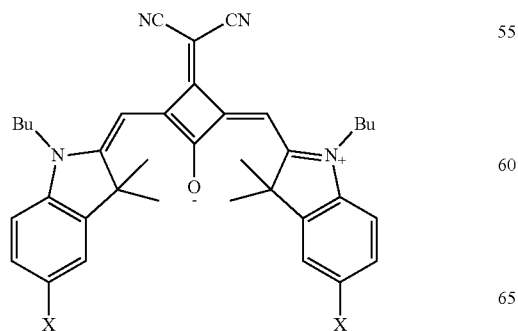

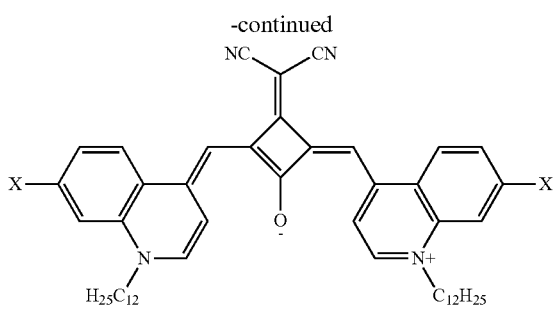

where X denotes one of H, Cl, Br and I.

As an example of rhodamine, materials represented by the following chemical formulas may be used:

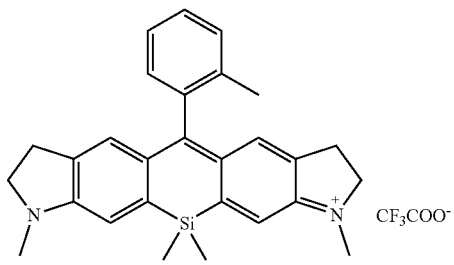

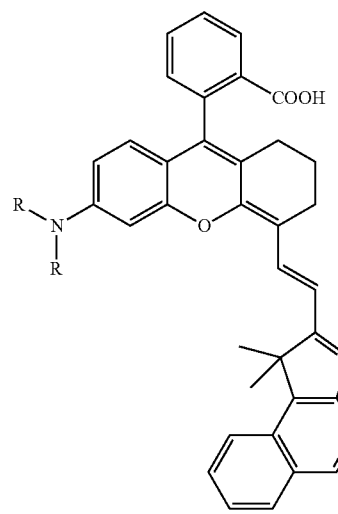

As an example of phthalocyanine, materials represented by the following chemical formulas may be used:

25

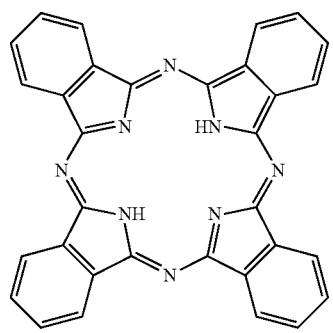

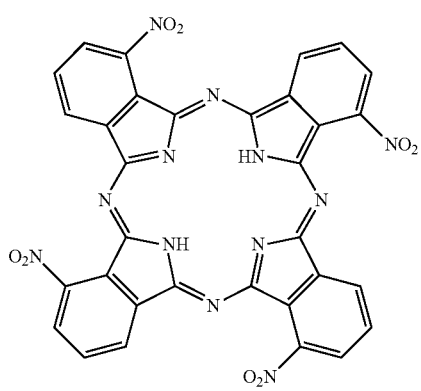

26

-continued

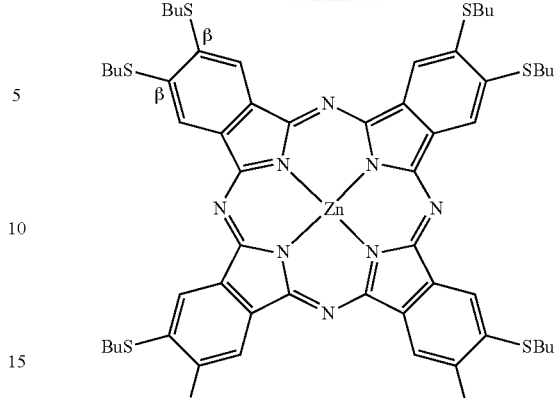

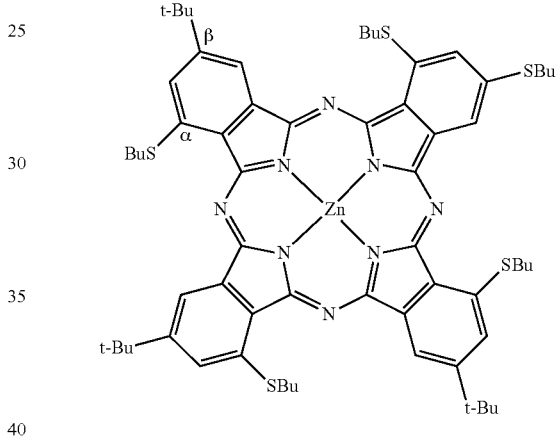

The content of the colorant may range from 10 to 40 wt % with respect to the total solid content of the composition.

As the metal composite, a material that converts red light into light in the near-infrared wavelength range may be used. As the metal composite, a composite such as Re, Os, Ru, Ir, and Pt may be used.

As an example of Re complex, a material represented by the following chemical formula may be used:

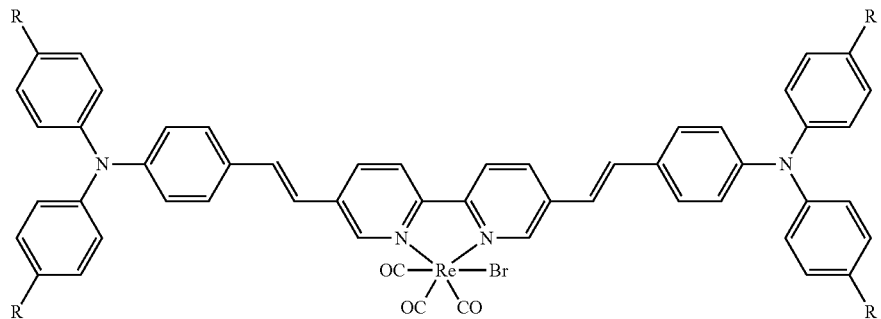

where R may be one of H,
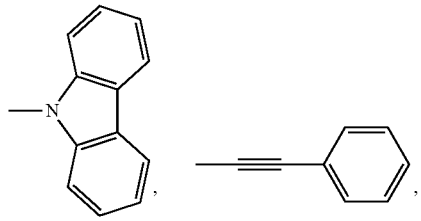
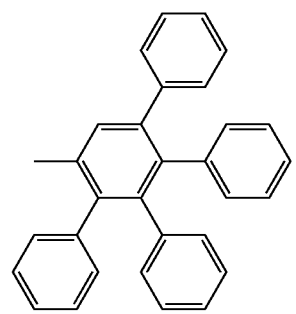
and
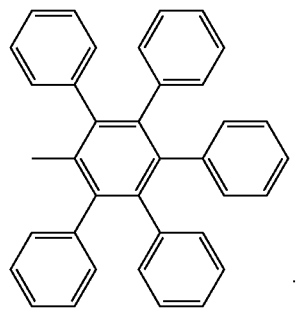
.
As an example of Ru complex, a material represented by the following chemical formula may be used;
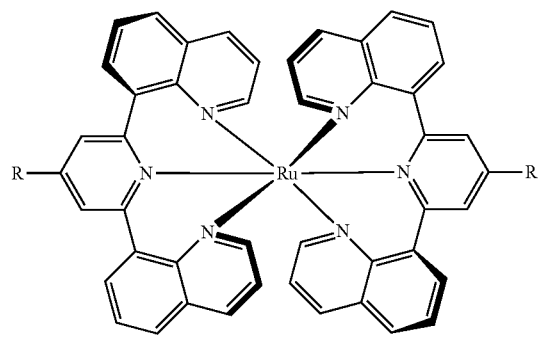
As an example of Os complex, materials represented by the following chemical formulas may be used:
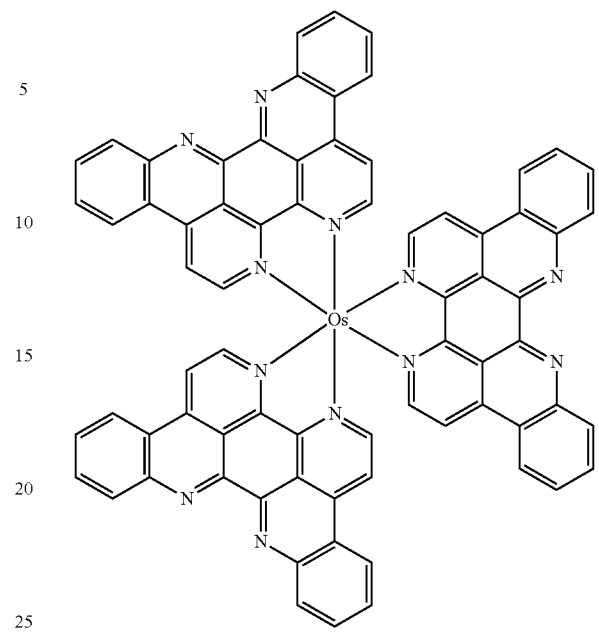
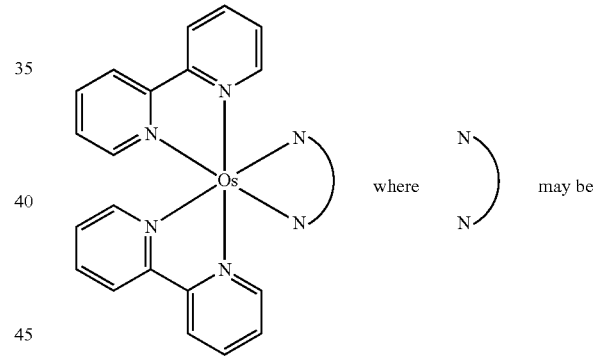
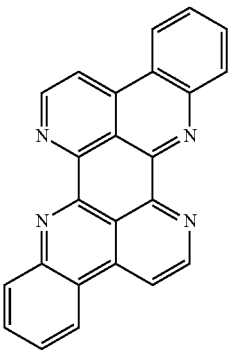 or 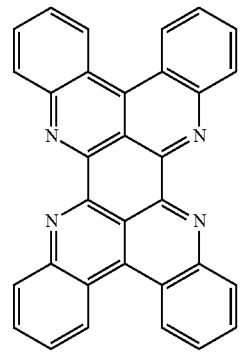

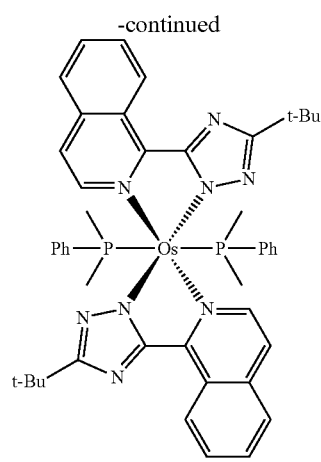
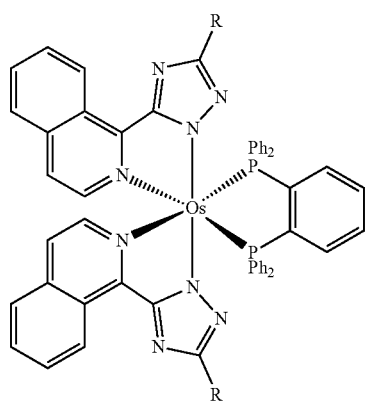
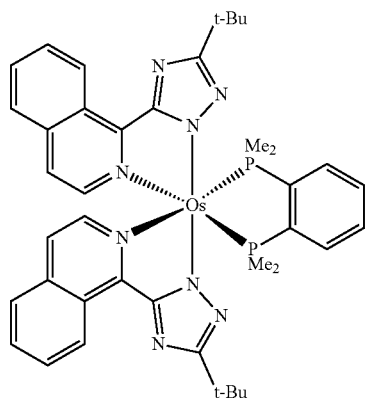
As an example of Ir complex, a material represented by the following chemical formula may be used:
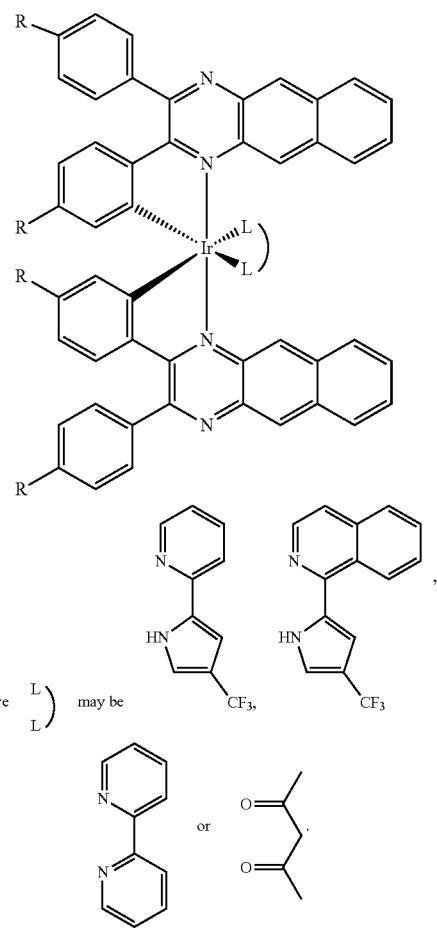
As an example of Pt complex, materials represented by the following chemical formulas may be used:
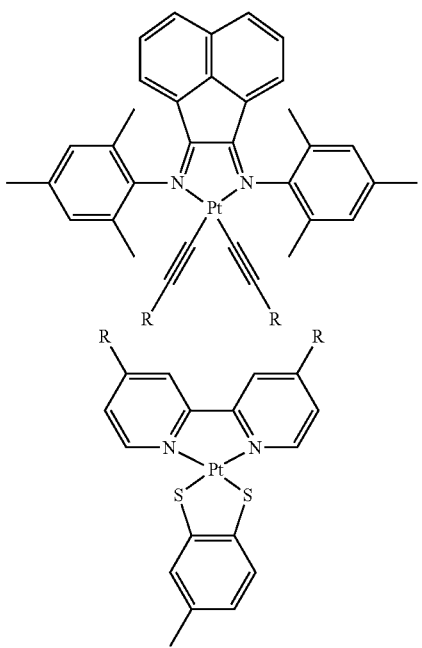

-continued

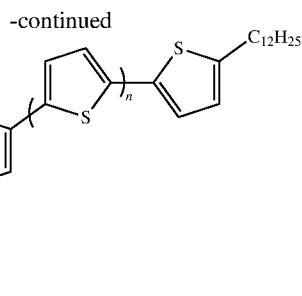

The content of the metal composite may range from 10 to 40 wt % with respect to the total solid content of the composition.

In addition, the first insulating layer 215 may further include scattering particles to increase luminous efficiency. The scattering particles may diffuse and reflect light, and may be, for example, particles such as $TiO_2$, $ZrO_2$ and ZnO.

Referring to FIG. 10, the first insulating layer 215 may include a light-converting material to convert light emitted from the fourth emission area EMA4 into near-infrared light. For example, red light RL may be emitted from the emissive layer 175 disposed in the fourth emission area EMA4 and may be incident on the first insulating layer 215. The first insulating layer 215 may convert the incident red light RL into near-infrared light NIRL. For example, if red light RL is incident on the first insulating layer 215, when electrons in the light-converting material dispersed in the first insulating layer 215, for example, quantum dots, organic pigments, dyes or metal composites transition to the excited state and then relax to the ground state, energy is released in the form of near-infrared light. In this manner, the first insulating layer 215 may convert red light RL emitted from the emissive layer 175 into near-infrared light NIRL.

When a user's finger touches the display panel, near-infrared light NIRL that is converted in the first insulating layer 215 and exits may be reflected by the ridges and valleys of the fingerprint. At this time, since the refractive index of the fingerprint is different from the refractive index of air, the amount of light reflected by the ridges of the fingerprint may be different from the amount of light reflected by the valleys. Accordingly, the ridges and the valleys of the fingerprint can be derived based on a difference in the amounts of reflected light, e.g., the light incident on the light-sensing areas RA. Since a photo conversion element PD outputs an electrical signal (e.g., a photocurrent) according to a difference in the amounts of light, a fingerprint pattern of a finger can be identified.

Referring back to FIG. 9, the first insulating layer 215 may be disposed on the base layer 205 of the touch sensing layer TSL. The first insulating layer 215 may be disposed such that it overlaps with the fourth emission area EMA4 in the third direction Z to convert light emitted from the fourth emission area EMA4 into near-infrared light. The first insulating layer 215 may be disposed to cover the fourth emission area EMA4 and overlap with the bank layer BK around the fourth emission area EMA4. In other words, the first insulating layer 215 overlapping the fourth emission area EMA4, may extend to peripheral areas NEA at opposite sides of the fourth emission area EMA4 in the first direction X.

As described above, since the first insulating layer 215 includes a light-converting material, the transmittance may decrease due to diffusion and reflection of light where light conversion is unnecessary.

According to an embodiment of the present disclosure, the first insulating layer 215 may include a plurality of openings to avoid the transmittance from decreasing. The first insulating layer 215 may include openings exposing regions overlapping some of the first to third emission areas EMA1, EMA2 and EMA3 and the light-sensing areas RA.

For example, the first insulating layer 215 may include a first opening OP1 overlapping a first emission area EMA1, a second opening OP2 overlapping a second emission area EMA2, a third opening OP3 overlapping a third emission area EMA3, and a fourth opening OP4 overlapping a light-sensing area RA. The first emission area EMA1, the second emission area EMA2 and the third emission area EMA3 may emit red, green and blue light to produce images. In addition, the light-sensing area RA may be an area where near-infrared light is incident on the photoelectric conversion element PD. Thus, since the first insulating layer 215 includes the first to fourth openings OP1, OP2, OP3 and OP4 exposing the first emission area EMA1, the second emission area EMA2, the third emission area EMA3 and the light-sensing area RA, it is possible to avoid the transmittance of light emitted from the first to third emission areas EMA1, EMA2 and EMA3 from decreasing to thereby improve the display quality. By avoiding the transmittance of near-infrared light incident on the light-sensing area RA from decreasing, it is possible to improve the accuracy of fingerprint recognition.

Incidentally, the second insulating layer 230 may be disposed on the first insulating layer 215 and the second touch conductive layer 220. The second insulating layer 230 may cover the first touch conductive layer 210, the first insulating layer 215 and the second touch conductive layer 220 disposed thereunder to provide a flat surface. The second insulating layer 230 may include an organic insulating material.

The second insulating layer 230 may transmit near-infrared light exiting from the first insulating layer 215, and may transmit the near-infrared light that is reflected by the user's fingerprint and incident on the light-sensing area RA. Accordingly, the second insulating layer 230 may affect the accuracy of fingerprint recognition.

Referring to FIG. 11, the accuracy of fingerprint recognition, in other words, the resolution, is an index representing the limit performance of a signal measurement method or device, and may depend on the smallest signal difference the method or device can recognize. The resolution can be improved as the size of the photoelectric conversion element PD is reduced, and as the size of the hole of the light-blocking member BM above on the photoelectric conversion element PD is reduced.

The resolution can be expressed by the following relational expression:

$$S = p + \frac{L}{l}(p + s)$$

where S denotes the length of a biopattern, for example, a fingerprint period, a vein period, etc., s denotes the width of the photoelectric conversion element PD, p denotes the width of the hole of the light-blocking member BM, l denotes the distance between the first insulating layer 215 and the light-blocking member BM, and L denotes the distance between the light-blocking member BM and the biopattern.

According to this relational expression, the smaller the biopattern length S is, the better the resolution is. In particular, to decrease the biopattern length S, the distance 1 between the first insulating layer 215 and the light-blocking member BM should be increased. According to an embodiment of the present disclosure, the resolution can be improved by setting the thickness of the second insulating layer 230 associated with the distance 1 between the first insulating layer 215 and the light-blocking member BM in the range of 5 to 10 μm.

Referring back to FIG. 9, the light-blocking member BM may be disposed on the touch sensing layer TSL. The light-blocking member BM may use a material that blocks light. The light-blocking member BM can block the light emitted from the first emission area EMA1, the second emission area EMA2 and the third emission area EMA3 so that these lights are not mixed. In addition, the light-blocking member BM can block near-infrared light emitted from the fourth emission area EMA4 and near-infrared light incident on the light-sensing area RA.

The light-blocking member BM may include an inorganic light-blocking material to block visible light and near-infrared light.

As shown in FIG. 12, the organic light-blocking material (organic BM) has a light transmittance of 80% or more in the near-infrared wavelength range, and the inorganic light-shielding material (inorganic BM) has a light transmittance of 10% or less in the near-infrared wavelength range. Since the hole size of the light-blocking member BM in the light-sensing area RA affects the resolution as in the above relationship, the light-blocking member BM is required to block near-infrared light in the light-sensing area RA for fingerprint sensing. According to an embodiment of the present disclosure, the light-blocking member BM may include an inorganic light-blocking material such as carbon black and chromium to block visible light and near-infrared light so that the resolution can be improved.

Referring back to FIG. 9, a color filter layer CF may be disposed on the light-blocking member BM and the second insulating layer 230. The color filter layer CF may include a first color filter CF1, a second color filter CF2, and a third color filter CF3.

The first color filter CF1 may overlap the first emission area EMA1, the second color filter CF2 may overlap the second emission area EMA2, and the third color filter CF3 may overlap the third emission area EMA3. In other words, the first color filter CF1 may overlap the first opening OP1, the second color filter CF2 may overlap the second opening OP2, and the third color filter CF3 may overlap the third opening OP3. The first color filter CF1 may selectively transmit green light and block or absorb blue light and red light. The first color filter CF1 may be a green color filter and may include a green colorant such as a green dye and a green pigment. The second color filter CF2 may selectively transmit red light and block or absorb blue light and green light. The second color filter CF2 may be a red color filter and may include a red colorant such as a red dye and a red pigment. The third color filter CF3 may selectively transmit blue light and block or absorb green light and red light. The third color filter CF3 may be a blue color filter and may include a blue colorant such as a blue dye and a blue pigment.

The above-described color filter layer CF may not overlap with the fourth emission area EMA4 and the light-sensing area RA. The fourth emission area EMA4 and the light-sensing area RA may transmit near-infrared light, and the color filter layer CF may not be disposed therein.

The color filter layer CF and the light-blocking member BM may be covered by an overcoating layer OC. The overcoating layer OC may be made of a material having excellent light transmittance. The overcoating layer OC may provide a flat surface over the color filter layer CF and the light-blocking member BM. The overcoating layer OC may be made of, but is not limited to, an acrylic epoxy material.

A window may be disposed on the overcoating layer OC. The window may be a protective member disposed on the overcoating layer OC to protect the elements of the display device 1. The window may be glass or plastic. When the window includes glass, an ultra thin glass (UTG) having a thickness of 0.1 mm or less may be employed to have flexible characteristics. In addition, a polarizing plate and a transparent adhesive member may be disposed between the window and the overcoating layer OC.

As described above, the display device 1 according to the embodiment includes the light-converting material in the first insulating layer 215 of the touch sensing layer TSL, so that it can convert light emitted from the fourth emission area EMA4 into near-infrared light. Accordingly, it is possible to eliminate a process of fabricating an emissive layer for emitting near-infrared light from the light-emitting element EL disposed in the fourth emission area EMA4.

In addition, since the first insulating layer 215 includes the first to fourth openings OP1, OP2, OP3 and OP4 overlapping the first to third emission areas EMA1, EMA2 and EMA3 exposing red, green and blue light and the light-sensing area RA, respectively, it is possible to avoid the transmittance of light emitted from the first to third emission areas EMA1, EMA2 and EMA3 from decreasing to thereby improve the display quality. By avoiding the transmittance of near-infrared light incident on the light-sensing area RA from decreasing, it is possible to improve the accuracy of fingerprint recognition.

In addition, the second insulating layer 230 has a thickness of 5 to 10 μm, thereby improving resolution, which is the fingerprint sensing feature.

In addition, since the light-blocking member BM includes an inorganic light-blocking material, it can block visible light and near-infrared light, thereby improving the resolution.

Figure 13:
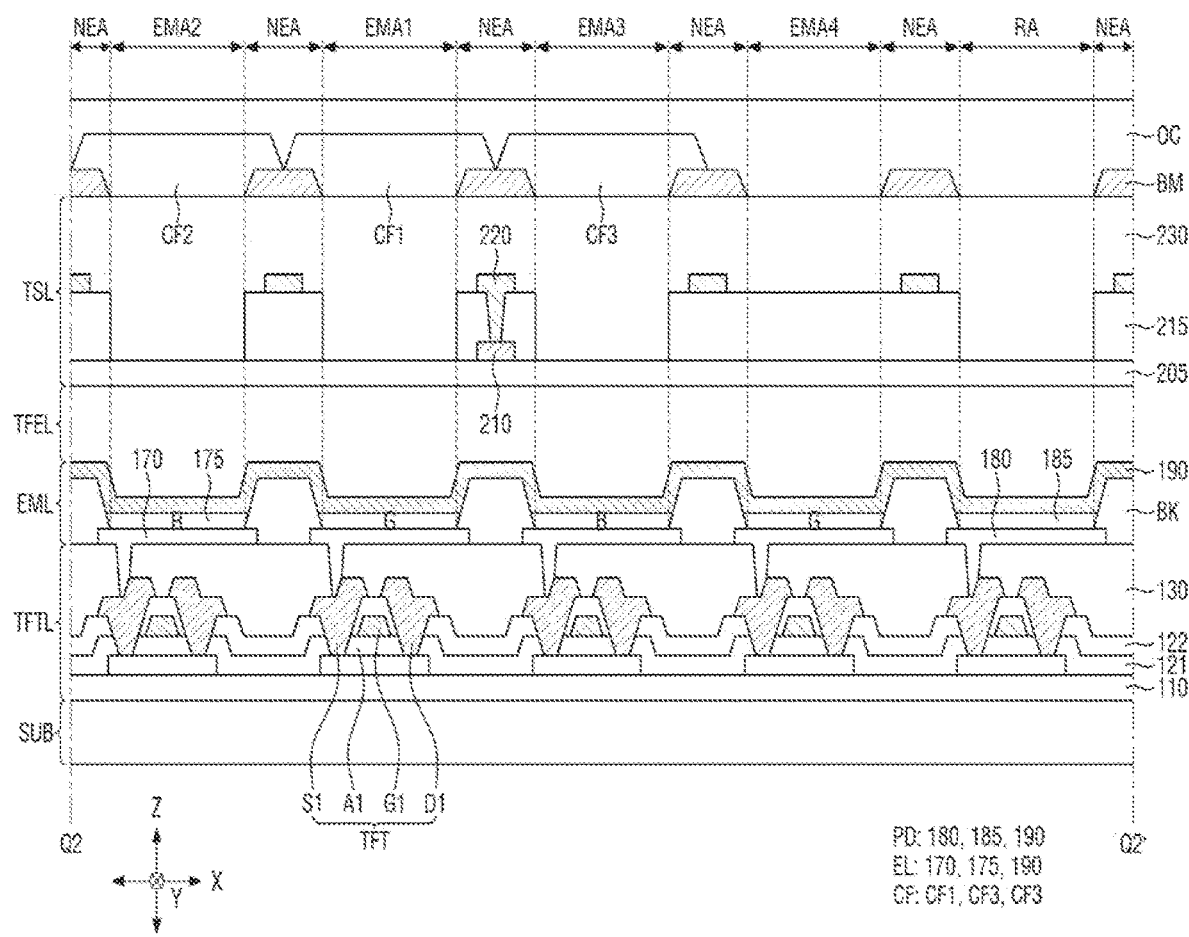
FIGS. 13 and 14 are cross-sectional views showing display devices according to other embodiments of the present disclosure.
Figure 14:
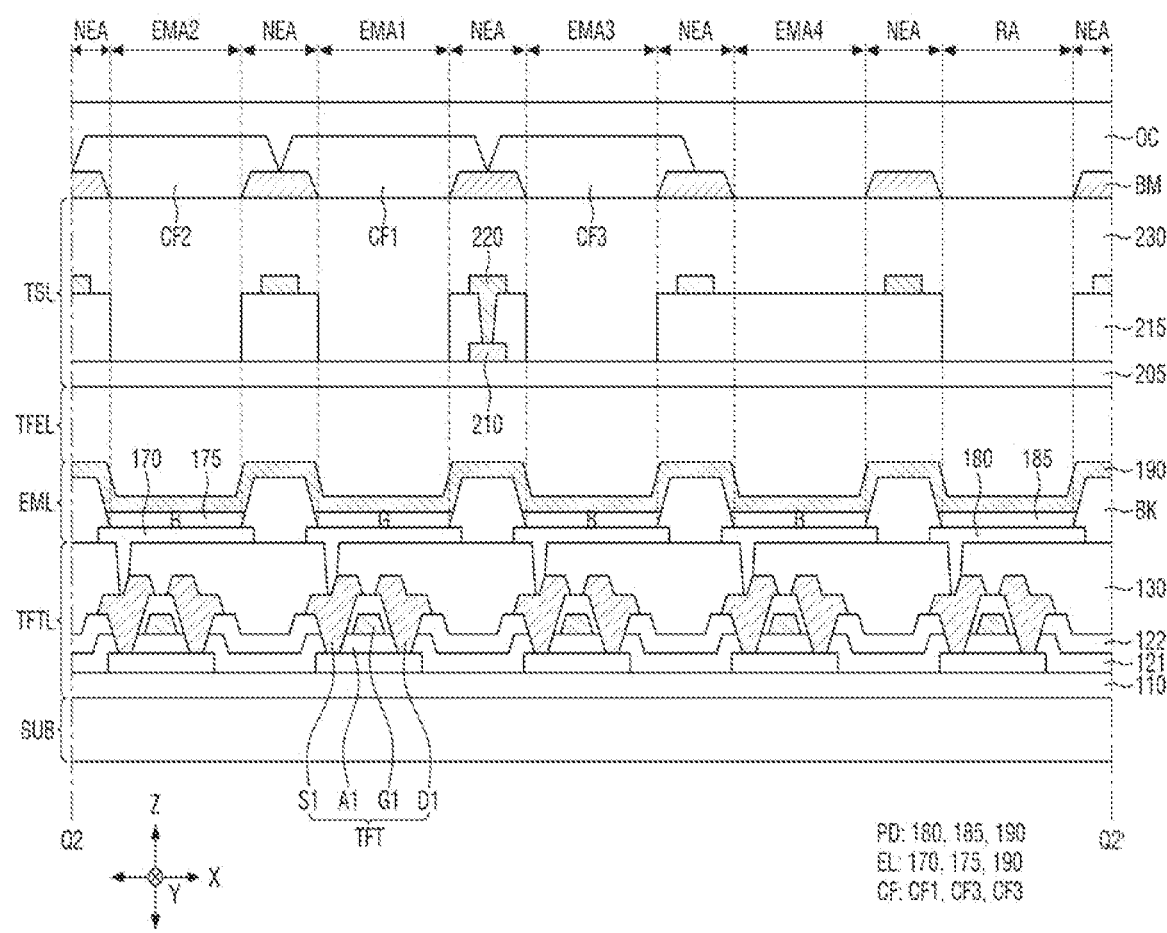

FIGS. 13 and 14 are cross-sectional views showing display devices according to other embodiments of the present disclosure. FIGS. 13 and 14 correspond to cross-sectional views taken along line Q2-Q2' of FIG. 8 and are modifications of the cross-sectional view of FIG. 9.

The embodiments are substantially identical to the above embodiment except that fourth emission areas EMA4 include an emissive layer 175 emitting green light and an emissive layer 175 emitting blue light, respectively; and, therefore, the redundant descriptions will be omitted.

Referring to FIG. 13, the fourth emission area EMA4 may include a light-emitting element EL. The light-emitting element EL may include a pixel electrode 170, an emissive layer 175 and a common electrode 190. The emissive layer 175 may emit green light.

The touch sensing layer TSL may include a first insulating layer 215 overlapping the fourth emission area EMA4. The first insulating layer 215 may include a light-converting material that converts green light emitted from the fourth emission area EMA4 into near-infrared light. The first insulating layer 215 may overlap the light-emitting element EL disposed in the fourth emission area EMA4.

When green light is emitted from the emissive layer 175 disposed in the fourth emission area EMA4, the light-converting material dispersed in the first insulating layer 215 may emit near-infrared light. Thus, the first insulating layer 215 can convert green light emitted from the emissive layer 175 into near-infrared light NIRL. In this case, the light-converting material included in the first insulating layer 215 may be quantum dots having an excitation light wavelength in a visible light wavelength range.

As described above, according to this embodiment, the light-converting material is included in the first insulating layer 215 overlapping the light-emitting element EL that emits green light, so that green light is converted into near-infrared light for fingerprint sensing.

In addition, referring to FIG. 14, the fourth emission area EMA4 may include a light-emitting element EL. The light-emitting element EL may include a pixel electrode 170, an emissive layer 175 and a common electrode 190. The emissive layer 175 may emit blue light.

The touch sensing layer TSL may include a first insulating layer 215 overlapping the fourth emission area EMA4. The first insulating layer 215 may include a light-converting material that converts blue light emitted from the fourth emission area EMA4 into near-infrared light. The first insulating layer 215 may overlap with the light-emitting element EL disposed in the fourth emission area EMA4.

When blue light is emitted from the emissive layer 175 disposed in the fourth emission area EMA4, the light conversion material dispersed in the first insulating layer 215 may emit near-infrared light. Thus, the first insulating layer 215 can convert blue light emitted from the emissive layer 175 into near-infrared light NIRL. In this case, the light-converting material included in the first insulating layer 215 may be quantum dots having an excitation light wavelength in a visible light wavelength range.

As described above, according to this embodiment, the light-converting material is included in the first insulating layer 215 overlapping the light-emitting element EL that emits blue light, so that blue light is converted into near-infrared light for fingerprint sensing.

In concluding the detailed description, those skilled in the art will appreciate that many variations and modifications can be made to the embodiments set forth herein without substantially departing from the scope of the present disclosure. Therefore, the disclosed embodiments are intended to not be limiting.

What is claimed is:

1. A display device comprising:
   a substrate;
   a plurality of light-emitting elements on the substrate; and
   a touch sensing layer disposed on the plurality of light-emitting elements,
   wherein the touch sensing layer comprises:
   a first touch conductive layer;
   a first insulating layer disposed on the first touch conductive layer;
   a second touch conductive layer disposed on the first insulating layer; and
   a second insulating layer disposed on and in direct contact with the first insulating layer and the second touch conductive layer,
   wherein the first insulating layer comprises a light-converting material that converts light into near-infrared light,
   wherein the light-emitting elements include a red light-emitting element, a green light-emitting element and a blue light-emitting element,
   wherein the green light-emitting element is disposed in a first emission area, the red light-emitting element is disposed in a second emission area, the blue light-emitting element is disposed in a third light emission area, and one of the red light-emitting element, the green light-emitting element or the blue light-emitting element is disposed in a fourth emission area, and
   wherein the first insulating layer overlaps with the fourth emission area and with peripheral areas adjacent to each of the first, second and third emission areas and exposes the first to third emission areas.

2. The display device of claim 1, wherein the first insulating layer comprises openings overlapping the first emission area, the second emission area, and the third emission area, respectively.

3. The display device of claim 1, further comprising: a photoelectric conversion element adjacent to the plurality of light-emitting elements,
   wherein the first insulating layer comprises an opening overlapping the photoelectric conversion element.

4. The device of claim 1, wherein the light-converting material includes quantum dots, a colorant, or a metal composite.

5. The display device of claim 4, wherein the colorant is an organic pigment or an organic dye.

6. The display device of claim 4, wherein a content of the quantum dots ranges from 20 wt % to 40 wt % with respect to a total solid content of the first insulating layer.

7. The display device of claim 4, wherein a content of the colorant or the metal composite ranges from 10 wt % to 40 wt % with respect to a total solid content of the first insulating layer.

8. The display device of claim 1,
   wherein the second insulating layer has a thickness of 5 μm to 10 μm.

9. A display device comprising:
   a substrate;
   a bank layer disposed on the substrate and defining a plurality of emission areas and a light-sensing area;
   a plurality of light-emitting elements and a photoelectric conversion element disposed on the substrate and the bank layer; and
   a touch sensing layer disposed on the plurality of light-emitting elements and the photoelectric conversion element,
   wherein the plurality of emission areas comprises at least two emission areas emitting a light of a same color,
   wherein the touch sensing layer comprises a first touch conductive layer, a second touch conductive layer, a first insulating layer between the first touch conductive layer and the second touch conductive layer and overlapping one of the two emission areas, and a second insulating layer disposed on and in direct contact with the first insulating layer and the second touch conductive layer, and
   wherein the first insulating layer comprises a light-converting material that converts light into near-infrared light,
   wherein the plurality of emission areas comprises a first emission area, a second emission area, a third emission area, and a fourth emission area arranged adjacent to one another, and
   wherein the plurality of light emitting elements comprises a light-emitting element overlapping with the first emission area and emitting green light, a light-emitting element overlapping with the second emission area and emitting red light, a light-emitting element overlapping with the third emission area and emitting blue light, and a light-emitting element overlapping with the fourth emission area and emitting one of green, red and blue lights, wherein the first insulating layer comprises openings overlapping the first emission area, the second emission area, the third emission area and the light-sensing area, respectively, and wherein the first insulating layer overlaps with the fourth emission area and with peripheral areas adjacent to each of the first, second and third emission areas.

10. The display device of claim 9, wherein the photoelectric conversion element comprises a photoelectric conversion layer overlapping with the light-sensing area and disposed between two electrodes.

11. The display device of claim 9, wherein one of the green, red and blue lights enters the first insulating layer and exits as the near-infrared light in the fourth emission area, and when the near-infrared light is reflected by a user's fingerprint, the near-infrared light is incident on the light-sensing area.

12. The display device of claim 9, further comprising:
a light-blocking member disposed on the touch sensing layer and overlapping with the bank layer, wherein the light-blocking member comprises carbon black or chrome.

13. The display device of claim 12, further comprising:
a color filter layer disposed on the touch sensing layer and the light-blocking member, wherein the color filter layer comprises a first color filter overlapping the first emission area, a second color filter overlapping the second emission area, and a third color filter overlapping the third emission area, and wherein the color filter layer does not overlap with the fourth emission area and the light-sensing area.

14. The device of claim 9, wherein the light-converting material includes quantum dots, a colorant, or a metal composite.

15. The display device of claim 9,
wherein the second insulating layer has a thickness of 5 μm to 10 μm.

* * * * *